US012802062B2

(12) United States Patent
Singh et al.

(10) Patent No.: US 12,802,062 B2
(45) Date of Patent: Nov. 17, 2026

(54) METHODS AND SYSTEMS FOR PERFORMING AN OFFLINE PAYMENT TRANSACTION IN ABSENCE OF NETWORK

(71) Applicant: Mastercard International Incorporated, Purchase, NY (US)

(72) Inventors: Sachin Singh, Maharashtra (IN); Arunmurthy Gurunathan, Maharashtra (IN); Akash Purohit, Pune (IN)

(73) Assignee: Mastercard International Incorporated, Purchase, NY (US)

( * ) Notice: Subject to any disclaimer, the term of this patent is extended or adjusted under 35 U.S.C. 154(b) by 711 days.

(21) Appl. No.: 17/010,784

(22) Filed: Sep. 2, 2020

(65) Prior Publication Data

US 2021/0065174 A1 Mar. 4, 2021

(30) Foreign Application Priority Data

Sep. 4, 2019 (SG) ........................... 10201908145U

(51) Int. Cl.

| | |
|---|---|
| ***G06Q 20/38*** | (2012.01) |
| ***G06Q 20/32*** | (2012.01) |
| ***G06Q 20/36*** | (2012.01) |

(52) U.S. Cl.

CPC ... *G06Q 20/38215* (2013.01); *G06Q 20/3278* (2013.01); *G06Q 20/3676* (2013.01); *G06Q 20/3678* (2013.01); *G06Q 20/3829* (2013.01)

(58) Field of Classification Search

CPC ................................................. G06Q 20/3278

See application file for complete search history.

(56) References Cited

U.S. PATENT DOCUMENTS

| | | | | |
|---|---|---|---|---|
| 6,000,832 A | 12/1999 | Franklin | | |
| 6,327,578 B1 * | 12/2001 | Linehan | ................ | G06Q 20/02 713/172 |

(Continued)

FOREIGN PATENT DOCUMENTS

| | | |
|---|---|---|
| CN | 101192295 A | 6/2008 |
| DE | 102011085537 A1 | 5/2013 |

(Continued)

OTHER PUBLICATIONS

PCT International Search Report, Application No. PCT/GB2017/051818, dated Sep. 1, 2017, 2 pp.

(Continued)

*Primary Examiner* — John W Hayes
*Assistant Examiner* — Zehra Raza
(74) *Attorney, Agent, or Firm* — Pramudji Law Group PLLC; Ari Pramudji

(57) ABSTRACT

Embodiments provide methods and systems for performing an offline payment transaction in absence of network. In an embodiment, a communication channel is established between a merchant device and a user device for performing the offline payment transaction. The merchant device receives an electronic token from the user device. The electronic token includes an identifier for a payment account of a user, an offline balance amount associated with the payment account and a digital certificate representing authentication of the offline balance amount. The electronic token has a validity of a first threshold time period. The electronic token is verified with a decryption key available with the merchant device. The decryption key also has a validity of a second threshold time period. After a successful verification of the electronic token, the offline payment transaction is executed without connecting to a payment (Continued)

network, while the electronic token and the decryption key are valid.

17 Claims, 11 Drawing Sheets

(56) References Cited

U.S. PATENT DOCUMENTS 6,434,238 B1 8/2002 Chaum et al.
7,027,773 B1 4/2006 McMillin
7,357,309 B2 4/2008 Ghosh
7,657,748 B2 * 2/2010 Gentry ................. H04L 9/0836 713/180
7,707,405 B1 4/2010 Gilman
8,720,771 B2 * 5/2014 MacKinnon Keith ....................... G06Q 20/384 235/375
9,195,984 B1 11/2015 Spector
9,262,651 B2 2/2016 Paulsen
9,595,030 B2 3/2017 Ekselius
9,674,892 B1 6/2017 Li
9,741,036 B1 8/2017 Grassadonia
9,774,401 B1 9/2017 Borrill
10,404,703 B1 9/2019 Peterson
10,496,856 B2 12/2019 Palermo
10,552,840 B2 2/2020 Smetz
10,706,400 B1 7/2020 Puffer et al.
10,902,423 B2 1/2021 Radu et al.
10,963,871 B2 3/2021 Safak et al.
11,074,564 B2 7/2021 Gurunathan et al.
11,080,697 B2 8/2021 Lakka et al.
11,080,713 B2 8/2021 Kohli
11,093,938 B2 8/2021 Parekh
11,107,066 B1 * 8/2021 Maeng ................. G06Q 20/367
11,107,078 B2 8/2021 Mariappan et al.
11,157,896 B2 10/2021 Nwokolo et al.
11,301,865 B2 4/2022 Tang
11,509,647 B2 11/2022 Tzhaki
11,544,781 B2 1/2023 Dogin
2002/0018569 A1 2/2002 Panjwani et al.
2004/0019571 A1 * 1/2004 Hurwitz ................. G06Q 20/06 705/65
2004/0230799 A1 11/2004 Davis
2005/0235148 A1 10/2005 Scheidt et al.
2006/0049258 A1 3/2006 Pikivi
2006/0219776 A1 10/2006 Finn
2006/0283960 A1 12/2006 Top
2007/0022058 A1 1/2007 Labrou et al.
2007/0125840 A1 6/2007 Law et al.
2008/0048036 A1 2/2008 Matsumoto et al.
2008/0071681 A1 3/2008 Khalid
2008/0208746 A1 8/2008 Royyuru
2008/0212771 A1 9/2008 Hauser
2009/0048971 A1 2/2009 Hathaway et al.
2009/0104888 A1 4/2009 Cox
2009/0154708 A1 6/2009 Kolar Sunder et al.
2010/0033299 A1 2/2010 Davis
2010/0327054 A1 12/2010 Hammad
2011/0022521 A1 1/2011 Collinge et al.
2011/0184867 A1 7/2011 Varadarajan
2011/0215159 A1 9/2011 Jain
2011/0238573 A1 9/2011 Varadarajan
2012/0036360 A1 2/2012 Bassu et al.
2012/0116902 A1 5/2012 Cardina et al.
2013/0182845 A1 7/2013 Monica et al.
2013/0212007 A1 8/2013 Mattsson
2013/0212025 A1 8/2013 Tanner
2013/0262296 A1 10/2013 Thomas et al.
2013/0262858 A1 10/2013 Neuman et al.
2013/0297508 A1 11/2013 Belamant
2013/0332344 A1 12/2013 Weber
2013/0332739 A1 12/2013 Yi et al.
2014/0040139 A1 2/2014 Brudnicki
2014/0061302 A1 3/2014 Hammad
2014/0122888 A1 5/2014 Yoon et al.
2014/0138435 A1 5/2014 Khalid
2014/0189359 A1 7/2014 Marien
2014/0191031 A1 7/2014 Paulsen
2014/0258135 A1 9/2014 Park
2014/0279556 A1 * 9/2014 Priebatsch ........... G06Q 20/385 705/67
2014/0358777 A1 12/2014 Gueh
2015/0032627 A1 1/2015 Dill et al.
2015/0032636 A1 1/2015 Wedekind
2015/0039890 A1 2/2015 Khosravi et al.
2015/0046339 A1 2/2015 Wong
2015/0112870 A1 4/2015 Nagasundaram et al.
2015/0127547 A1 5/2015 Powell et al.
2015/0137949 A1 5/2015 Rofougaran et al.
2015/0142673 A1 * 5/2015 Nelsen ................ G06Q 20/405 705/76
2015/0262180 A1 * 9/2015 Hambleton ........ G06Q 20/3829 705/44
2015/0269566 A1 9/2015 Gaddam et al.
2015/0294305 A1 10/2015 Wang
2015/0302390 A1 10/2015 Huxham et al.
2015/0310425 A1 10/2015 Cacioppo
2016/0005037 A1 1/2016 Eilertsen
2016/0007196 A1 1/2016 Jepson et al.
2016/0013935 A1 1/2016 Pahl et al.
2016/0065370 A1 3/2016 Le Saint
2016/0071095 A1 3/2016 Foerster et al.
2016/0117715 A1 4/2016 Gross et al.
2016/0217467 A1 7/2016 Smets et al.
2016/0218875 A1 7/2016 Le Saint et al.
2016/0224971 A1 8/2016 Aabye
2016/0307186 A1 10/2016 Noe
2017/0070485 A1 3/2017 Kumar et al.
2017/0091758 A1 3/2017 Kim et al.
2017/0178090 A1 * 6/2017 Sarin .................. G06Q 20/3224
2017/0221056 A1 8/2017 Karpenko et al.
2017/0330181 A1 11/2017 Ortiz
2017/0330184 A1 11/2017 Sabt
2017/0344974 A1 11/2017 Britt
2017/0366344 A1 12/2017 Berzin et al.
2017/0373852 A1 12/2017 Cassin et al.
2018/0005231 A1 1/2018 Grassadonia et al.
2018/0006821 A1 1/2018 Kinagi
2018/0025354 A1 1/2018 Groarke et al.
2018/0047016 A1 2/2018 Sarin
2018/0068293 A1 3/2018 Dunne
2018/0097639 A1 4/2018 Gulati et al.
2018/0167367 A1 6/2018 John et al.
2018/0232734 A1 8/2018 Smets et al.
2018/0240115 A1 8/2018 Wong et al.
2018/0349907 A1 12/2018 Dixon
2019/0026716 A1 1/2019 Anbukkarasu
2019/0034929 A1 1/2019 Tang et al.
2019/0044734 A1 2/2019 Lancashire et al.
2019/0066097 A1 2/2019 Mackie
2019/0075094 A1 3/2019 Clarke
2019/0108462 A1 4/2019 Deloo
2019/0147449 A1 5/2019 Cole
2019/0188696 A1 6/2019 Carpenter et al.
2019/0205575 A1 7/2019 Gardiner et al.
2019/0213585 A1 7/2019 Patni
2019/0228408 A1 7/2019 Sing
2019/0229897 A1 7/2019 Verrall et al.
2019/0253434 A1 8/2019 Biyani et al.
2019/0318345 A1 10/2019 Kallugudde
2019/0362339 A1 11/2019 Gurunathan et al.
2019/0370790 A1 12/2019 Spector
2019/0392411 A1 12/2019 Jain et al.
2020/0009454 A1 1/2020 Kaiho et al.
2020/0019961 A1 1/2020 Silvestre
2020/0027078 A1 1/2020 Kallugudde et al.
2020/0027086 A1 1/2020 Rao et al.
2020/0090184 A1 3/2020 Kallugudde et al.
2020/0154270 A1 5/2020 Byington et al.
2020/0160325 A1 5/2020 Kim et al.
2020/0219090 A1 7/2020 Zarakas et al.
2020/0265420 A1 8/2020 Hamdan et al.
2020/0302441 A1 9/2020 Collinge et al.

(56) References Cited

U.S. PATENT DOCUMENTS

| | | | |
|---|---|---|---|
| 2020/0410483 | A1 | 12/2020 | Dill et al. |
| 2021/0012322 | A1 | 1/2021 | Manchanda |
| 2021/0064778 | A1 | 3/2021 | Vladimerou |
| 2021/0065156 | A1 | 3/2021 | Kadiwala et al. |
| 2021/0073793 | A1 | 3/2021 | Govindarajan et al. |
| 2021/0073913 | A1 | 3/2021 | Ingargiola |
| 2021/0176051 | A1 | 6/2021 | Falk et al. |
| 2021/0176060 | A1 | 6/2021 | Kallugudde |
| 2021/0217005 | A1 | 7/2021 | Mehrhoff et al. |
| 2021/0287211 | A1 | 9/2021 | Aabye et al. |
| 2021/0374708 | A1 | 12/2021 | Dunjic |
| 2022/0045848 | A1 | 2/2022 | Hulshof |
| 2022/0122081 | A1 | 4/2022 | Wagner et al. |
| 2022/0156723 | A1 | 5/2022 | Lovato et al. |
| 2022/0198428 | A1 | 6/2022 | Peterson |
| 2022/0248221 | A1 | 8/2022 | Nix |
| 2024/0257092 | A1 | 8/2024 | Bimolaksono et al. |

FOREIGN PATENT DOCUMENTS

| | | | |
|---|---|---|---|
| EP | 0919945 | A2 | 6/1999 |
| EP | 1773018 | A1 | 4/2007 |
| EP | 2189934 | A2 | 5/2010 |
| EP | 2390817 | A | 11/2011 |
| EP | 3618403 | A1 | 3/2020 |
| JP | 2008129890 | A | 6/2008 |
| JP | 2008-204248 | A | 9/2008 |
| KR | 10-2014-0008668 | A | 1/2014 |
| KR | 101502460 | B1 | 3/2015 |
| KR | 2016-0099464 | A | 8/2016 |
| KR | 101679783 | B1 | 11/2016 |
| KR | 2016-0140216 | A | 12/2016 |
| KR | 20170058903 | A | 5/2017 |
| WO | 1997046964 | A1 | 12/1997 |
| WO | 2001-099070 | A2 | 12/2001 |
| WO | 2003-038719 | A1 | 5/2003 |
| WO | 2008-059465 | A2 | 5/2008 |
| WO | 2010-070539 | A1 | 6/2010 |
| WO | 2010-099352 | A1 | 9/2010 |
| WO | 2013-050296 | A1 | 4/2013 |
| WO | 2013155627 | A1 | 10/2013 |
| WO | 2014081494 | A1 | 5/2014 |
| WO | 2016-033610 | A1 | 3/2016 |
| WO | 2016-123309 | A1 | 8/2016 |
| WO | 2016-161000 | A1 | 10/2016 |
| WO | 2017007935 | A1 | 1/2017 |
| WO | 2018-031856 | A1 | 2/2018 |
| WO | 2019-136044 | A1 | 7/2019 |
| WO | 2019-161003 | A1 | 8/2019 |
| WO | 2020-243286 | A | 12/2020 |

OTHER PUBLICATIONS

EP Communication pursuant to Article 94 (3) EPC; 19184252.5; Aug. 25, 2022, pp. 1-7.
EP 19187159.9 European Summons to attend oral proceedings pursuant to Rule 115 (1) dated Jul. 29, 2022, pp. 1-10.
PCT International Search Report and Written Opinion, PCT/US2020-039521; Oct. 14, 2020.
EPO Office Action; EP 19187159.9; Jun. 8, 2021.
EPO Search Report; EP 19187159.9; Apr. 17, 2020.
Yingjiu, et al.; A Security-Enhanced One-Time Payment Scheme for Credit Card; 14th International Workshop on Research Issues on Data Engineering; Web Services for E-Commerce and E-Government Applications (RIDE'04); IEEE; 2004.
EMV MasterCard Contactless Transaction Flow, EMV Level 2 Kernels, https://www.level2kernel.com/emv-mastercard-contactless-transaction.html, 2021, pp. 1-3.
EMV Overview—Elavon Developer Portal, https://developer.elavon.com/na/docs/viaconex/1.0.0/emv-integration-guide/3_emv_overview, 2022, pp. 1-33.
EMV, https://en.wikipedia.org/wiki/EMV, Wikipedia, Jan. 18, 2022 (last edited), pp. 1-26.
Tokenization (data security), https://en.wikipedia.org/wiki/Tokenization_(data_security), Wikipedia, Jan. 8, 2022 (last edited), pp. 1-8.
EMV Integrated Circuit Card Specifications for Payment Systems, Book 4 Cardholder, Attendant, and Acquirer Interface Requirements, Nov. 2011, pp. 1-154, EMC Version 4.3 Book 4.
A Guide to EMV Chip Technology, Nov. 2014, pp. 1-36, Version 2.0, EMVCo, LLC.
Field 55: ICC Data, Elavon Developer Portal, https://developer-eu.elavon.com/docs/eisop/field-descriptions/field-55-icc-data, 2021, pp. 1-11.
Terminal verification results, https://en.wikipedia.org/wiki/Terminal_verification_results, Wikipedia, Dec. 12, 2021 (last edited), pp. 1-3.
Smart card application protocol data unit, https://en.wikipedia.org/wiki/Smart_card_application_protocol_data_unit, Wikipedia, Aug. 24, 2021 (last edited), pp. 1-3.
O. Ogundele, et al.; "The Implementation of a Full EMV Smartcard for a Point-of-Sale Transaction," World Congress on Internet Security (WorldCIS—2012), Guelph, ON, Canada, 2012, pp. 28-35.
EMVco Payment Account Reference (PAR): A Primer, Version 1.1, Secure Technology Alliance, Apr. 30, 2018, pp. 1-20.
PCT/SG2022/050327 Search Report and Written Opinion dated Dec. 23, 2022, pp. 1-20.
PCT/US2022/049771 International Search Report and Written Opinion dated Mar. 20, 2023, pp. 1-19.
PCT/US2020/040206I International Search Report and Written Opinion dated Oct. 21, 2020.
PCT/US2021/018344 International Search Report and Written Opinion dated May 27, 2021, pp. 1-11.
EP 20159634.3 Extended European Search Report dated Jul. 30, 2020, pp. 1-8.
PCT/US2021/042321 International Search Report and Written Opinion dated Nov. 11, 2021, pp. 1-11.
GB 2012833.6 Search Report dated Jan. 27, 2021, pp. 1-2.
PCT International Search Report and Written Opinion, PCT/US2021/047077; Dec. 14, 2021.
EP Search Report; EP 21858781.4; Jul. 12, 2024.
SG10202204968V Written Opinion dated Jan. 23, 2025, pp. 1-26.
PCT International Search Report and Written Opinion; PCT/US2022/026134; Jul. 8, 2022.
UKIPO Search Report; GB 2106783.0; Feb. 7, 2022.
Zouina, et al.; Towards a Distributed Token Based Payment System Using Blockchain Technology; 2019 International Conference on Advanced Communication Technologies and Networking (CommNet); 2019. DOI: 10.1109/COMMNET.2019.8742380.
SG Written Opinion; SG 10202204968V; Sep. 30, 2025; pp. 1-7.
PCT/US2025/046740 International Search Report and Written Opinion dated Jan. 16, 2026, pp. 1-12.

* cited by examiner

METHODS AND SYSTEMS FOR PERFORMING AN OFFLINE PAYMENT TRANSACTION IN ABSENCE OF NETWORK

TECHNICAL FIELD

The present disclosure generally relates to a payment system and, more particularly to, methods and systems for performing an offline payment transaction in absence of network.

BACKGROUND

In present time, an online payment transaction is commonly used by many users for purchasing goods/services. The online payment transaction is performed using a network connectivity. However, when there are issues with the network connectivity, the online payment transaction is hindered. In such situations, the payment transaction can be performed in an offline manner. In an offline payment transaction, a merchant needs a confirmation from the user. After receiving the confirmation, the merchant proceeds with the offline payment transaction.

However, the offline payment transaction is validated by connecting to the network. For instance, a merchant device forwards a payment request along with unique digital signatures to a remote server, which is via a network connection. Here, the merchant device requires the network connection for communicating with the remote server. Although a user device is offline, the merchant is required to access the network for the offline payment validation. Thus, when both (i.e., the user device and the merchant device) are offline, validating the offline payment transaction in absence of the network, is inoperable.

Therefore, there exists a need to perform the offline payment transaction in real-time, without accessing the network. More specifically, there is need to provide a technological solution to validate the offline payment transaction when both devices of the merchant and the user are not connected to the network.

SUMMARY

Various embodiments of the present disclosure provide systems and methods for performing and validating payment transactions in absence of network connectivity.

In an embodiment, a method for performing an offline payment transaction is disclosed. The method includes establishing, by a merchant device, a communication channel with a user device. The method includes receiving, by the merchant device, an electronic token from the user device. The electronic token includes an identifier for a payment account of a user, an offline balance amount associated with the payment account and a digital certificate representing authentication of the offline balance amount. The electronic token has a validity of a first threshold time period from generation of the electronic token. The method includes verifying, by the merchant device, the electronic token with a decryption key available with the merchant device. The decryption key has a validity of a second threshold time period from generation of the decryption key. The method further includes executing, by the merchant device, the offline payment transaction without establishing connection with a payment network based on successful verification of the electronic token by the decryption key while the electronic token and the decryption key are valid.

In another embodiment, a system for performing an offline payment transaction is disclosed. The system includes a memory and a processor. The memory includes stored instructions. The processor is configured to execute the stored instructions to cause the system to perform at least in part to establish a communication channel with a user device. The system is caused to perform at least in part to receive an electronic token from the user device. The electronic token includes an identifier for a payment account of a user, an offline balance amount associated with the payment account and a digital certificate representing authentication of the offline balance amount. The electronic token has a validity of a first threshold time period from generation of the electronic token. The system is caused to perform at least in part to verify the electronic token with a decryption key available with the merchant device. The decryption key has a validity of a second threshold time period from generation of the decryption key. The system is further caused to perform at least in part to execute the offline payment transaction without establishing connection with a payment network based on successful verification of the electronic token by the decryption key while the electronic token and the decryption key are valid.

In yet another embodiment, a method for performing an offline payment transaction is disclosed. The method includes generating an electronic token for a payment account of a user with a validity of a first threshold time period. The electronic token includes an identifier for the payment account, an offline balance amount associated with the payment account and a digital certificate representing authentication of the offline balance amount. The method includes providing the electronic token to an offline payment application available in a user device. The method includes generating a decryption key with a validity of a second threshold time period for verifying the electronic token. The method further includes providing the decryption key to a merchant device. Upon establishing a connection between the user device and the merchant device via a communication channel, the offline payment transaction is executed without establishing connection with a payment network based on successful verification of the electronic token by the decryption key while the electronic token and the decryption key are valid.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

Figure 1:
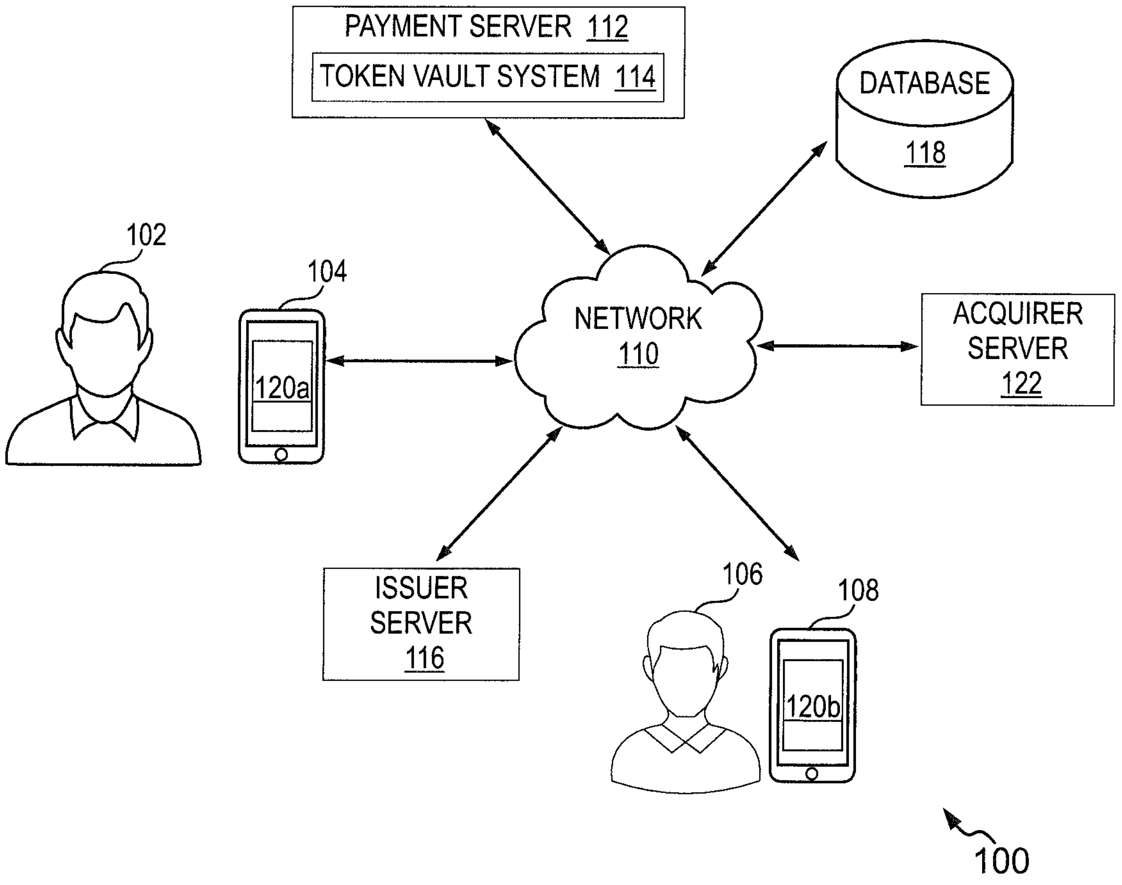
FIG. 1 illustrates an example representation of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "payment account" used throughout the description refers to a financial account that is used to fund the financial transaction (interchangeably referred to as "payment transaction"). Examples of the payment account include, but are not limited to a savings account, a credit account, a checking account and a virtual payment account. The payment account may be associated with an entity such as an individual person, a family, a commercial entity, a company, a corporation, a governmental entity, a non-profit organization and the like. In some scenarios, a payment account may be a virtual or temporary payment account that can be mapped or linked to a primary payment account, such as those accounts managed by PayPal®, and the like.

The term "payment card", used throughout the description, refers to a physical or virtual card linked with a financial or payment account that may be presented to a merchant or any such facility in order to fund a financial transaction via the associated payment account. Examples of the payment card include, but are not limited to, debit cards, credit cards, prepaid cards, virtual payment numbers, virtual card numbers, forex cards, charge cards, e-wallet cards, and stored-value cards. A payment card may be a physical card that may be presented to the merchant for funding the payment. Alternatively or additionally, the payment card may be embodied in form of data stored in a user device, where the data is associated with payment account such that the data can be used to process the financial transaction between the payment account and a merchant's financial account.

The term "payment network", used throughout the description, refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, Etc.

Overview

Various example embodiments of the present disclosure provide systems and methods for performing offline payment transactions that overcome above-mentioned obstacles and provide additional advantages. More specifically, techniques disclosed herein enable validating the offline payment transactions in real-time when both a user device and a merchant device are offline.

In an example embodiment, an electronic token is generated for validating the offline payment transaction. Initially, a user is registered for the offline payment transaction using an offline payment application. In the registration, basic information of the user is provided. The basic information includes one or more of a name, a date-of-birth, an email id, a social security number (SSN) or a permanent account number (PAN), an identifier for a payment account of the user and other payment account information of the user. The offline payment application is installed or accessible in a user device of the user.

After the registration, the offline payment application shares the identifier associated with the user to a token vault system via the network. The token vault system generates an electronic token upon receiving the identifier. In an example embodiment, the electronic token is generated with a validity of a first threshold time period. For example, the electronic token is valid for a time period, such as 24 hours, 72 hours, 1 day, 3 days, or the like. In one example embodiment, the electronic token is generated through a mapping with a unique identifier associated with the user, for instance PAN. In the PAN mapping, the PAN of the user is mapped to a token value. The token value is accessed from a token repository of the token vault system.

Further, the electronic token is used to fetch a current balance amount available in the payment account, a score for computing an offline balance amount associated with the payment account and a digital certificate issued by an issuer of the user. The digital certificate represents authentication of the offline balance amount. In an example embodiment, the score is calculated by the issuer based on a number of success rates of historical offline payment transactions of the user and an average balance amount in the payment account. In case the number of success rates is null, then the score is calculated based on a set of rules. The set of rules may be stored in a rule engine at the issuer end. For instance, if the user is new to the offline payment transaction then the set of rules are used for calculating the score. The score may be used for locking a usable amount, i.e., the offline balance amount for the offline payment transaction. After locking the offline balance amount, the electronic token that includes the offline balance amount and the digital certificate, is provided to the user device. The user device encrypts the electronic token and embeds the electronic token in a machine-readable code, such as a Quick Response (QR) code. The QR code is stored in the user device for the offline payment transaction.

In a similar manner of the user registration, a registration of a merchant for the offline payment transaction is performed using the offline payment application in the merchant device. During the registration, merchant information, such as a merchant name, a merchant identifier, a merchant address, an industry classification code and/or the like are provided. After the registration, the merchant sends a request to the token vault system for generating a decryption key. The token vault system generates the decryption key upon receiving the request. The decryption key is generated with a validity of a second threshold time. For example, the decryption key may be valid for 24 hours, 72 hours, or the like. The decryption key is provided to the merchant device via the network. The merchant device stores the decryption key. When the merchant device receives the electronic token, the decryption key is accessed for decrypting the electronic token.

In an example scenario, when an online payment transaction cannot be performed, the offline payment transaction is initiated. For instance, when the user is initiating the online payment transaction, the merchant may not be connected to a network. In such scenario, the online payment transaction could not be completed causing inconvenience to the user. In another example scenario, the merchant may visit the user to collect a payment for an online order with a payment-on-delivery option. The user may prefer to pay the merchant using a digital wallet or a payment card of the user. However, if there is a network connectivity issue in location of the user then both the user device and the merchant device may not be able to perform the online payment transaction. In such scenarios, the offline payment transaction is initiated.

In an example embodiment, a communication channel is established between the user device and the merchant device for performing the offline payment transaction. For example, the user device and the merchant device are connected via a short-range communication channel such as Bluetooth channel, a near-field communication (NFC) channel, a Zigbee communication channel, an Infrared communication channel or the like. After the establishment, the QR code is provided to the merchant device. The merchant device scans the QR code and extracts the electronic token (i.e., the encrypted electronic token) along with offline balance amount and the digital certificate. After the extraction, the decryption key available in the merchant device is accessed. The electronic key is decrypted using the decryption key. The decrypted electronic token along with the offline balance amount and the digital certificate is displayed to the merchant. The merchant authenticates the electronic token (i.e., the decrypted electronic token). In an example embodiment, the merchant verifies the electronic token based on an identification of an authorized logo or signature in the digital certificate.

After the verification, the merchant provides a transaction amount for the offline payment transaction in the merchant device. The transaction amount is compared with the offline balance amount. The transaction amount is deducted based on the comparison. In one case, if the transaction amount is less than the offline balance amount, then the transaction amount is deducted from the offline balance amount. For example, if the transaction amount is $400, and offline balance amount is $500, the transaction amount can be deducted from the offline balance amount, and the offline balance amount becomes $100. In another case, if the transaction amount is more than the offline balance amount, then the transaction amount is modified. For example, the transaction amount=$500 is more than the offline balance amount=$400. In such case, the merchant modifies the transaction amount such that the transaction amount is deductible from the offline balance amount. The transaction amount is modified as $400, which is deductible from the offline balance amount. The modified transaction amount is deducted from the offline balance amount. After deducting the modified transaction amount, the offline balance amount becomes 0 with an outstanding amount=$100.

The offline balance amount is updated based on the deduction. Further, the electronic token is updated with the updated offline balance amount. In case of deducting the modified transaction amount, the offline balance amount is updated with the outstanding amount (i.e., $100). For instance, the offline balance amount is updated as '−$100'. The updated electronic token is embedded in a QR code generated by the merchant device. The QR code is provided to the user device via the communication channel.

In an example scenario, the electronic token (or the updated electronic token) may become invalid upon expiry of a certain threshold time period. In such scenario, the electronic token needs to be refreshed. The electronic token is refreshed when the user device is online. For instance, the electronic token is exchanged with a new electronic token generated by the token vault system. The new electronic token includes a new offline balance amount and a digital certificate allocated with a validity of a new threshold time period. In case, the electronic token becomes invalid then the offline balance amount (i.e., $400) is credited back to the payment account of the user as soon as the user device regains network conn.

Thus, the offline payment transaction is executed without establishing connection with a payment network based on successful verification of the electronic token by the decryption key, while the electronic token and the decryption key are valid. The execution of the offline payment transaction based on the electronic token via the communication channel, is further explained in detail with reference to FIGS. 1 to 12.

FIG. 1 illustrates an example representation of an environment 100 related to at least some example embodiments of the present disclosure can be implemented. The environment 100 is depicted to include a user 102 associated with a user device 104. The user device 104 may be a smartphone, a tablet, a laptop, a computer system or any computing device. The user 102 registers to an offline payment application, such as application 120*a* available in the user device 104. When the user 102 is registered, basic information of the user 102 is provided in the application 120*a*. The basic information includes an identifier for a payment account of the user 102, a name of the user 102, a date-of-birth (DOB) of the user 102, an email id of the user 102, and other identifiers such as SSN/PAN of the user 102, or the like. The basic information may be stored in a database, such as a database 118. In one example embodiment, the database 118 may be associated with the payment server 112. In another example embodiment, the database 118 may be embodied in the payment server 112.

The user device 104 may communicate with the payment server 112 via a network, such as a network 110. The network 110 may include wired networks, wireless networks and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, Wi-Fi or Zigbee networks, and the like. An example of the combination of wired and wireless networks may include the Internet.

In an example embodiment, the application 120*a* is hosted by a payment server 112. More specifically, instances of the application, hosted by the payment server 112 may be downloaded and installed in the user device 104. For example, an instance of the application installed in the user device 104, may cause the user device 104 to capture the basic information, share the basic information such as the identifier to the payment server 112 for generating an electronic token, receive the electronic token, encrypt the electronic token and embed the encrypted token in a machine-readable code.

The payment server 112 provides the identifier to a token vault system 114. In at least an example embodiment, the token vault system 114 is embodied in the payment server 112. In another example embodiment, the token vault system 114 may exist as a stand-alone system associated with the payment server 112. The token vault system 114 generates the electronic token upon receiving the identifier. For instance, the electronic token is generated by mapping the SSN/PAN to a token value. The token value is accessed from a token repository of the token vault system 114. The electronic token has a validity of a first threshold time period from generation of the electronic token. The user 102 is required to use the token within the validity of the first threshold time period. It shall be noted that the token vault system 114 described throughout the disclosure, is interchangeably referred to hereinafter as the system 114.

Further, the electronic token (simply referred to hereinafter as token) is used to fetch a current balance amount available in the payment account, a score for computing an offline balance amount for the payment account and a digital certificate representing authentication of the offline balance amount. In an example embodiment, the system 114 sends the token to an issuer server 116 (also referred to as 'issuer 116'). The token is sent to the issuer 116 based on the identifier. In an illustrative example, the identifier is a virtual payment address (VPA) for a payment account of the user 102. The VPA is a unique payment address that is uniquely mapped to a user's payment account for using in financial transactions. More specifically, the system 114 identifies the issuer 116 based on the VPA. For example, the VPA with 'SAM@BANK' is a payment address of a user 'SAM', whose payment account belongs to 'BANK'.

When the issuer 116 receives the identifier, the issuer 116 issues the current balance amount, the score and the digital certificate. In an example embodiment, the score is computed based at least on a number of success rates of offline payment transactions of the user 102 and an average balance amount in the payment account. In another example embodiment, the score is computed based on a set of rules if the payment account has no history of offline payment transactions. When there is no history of the offline payment transactions, the number of success rates is null. The set of rules is provided by a rule engine of the issuer 116. In one example embodiment, the digital certificate is issued based on the basic information, such as the identifier (i.e., the VPA), the PAN, the score and a unique bank ID of the issuer 116.

Further, the issuer 116 provides the token with the current balance amount, the score and the digital certificate to the system 114. The system 114 locks the offline balance amount for the offline payment transaction based on receiving the token with current balance amount, the score and the digital certificate from the issuer 116. In an example embodiment, the system 114 calculates the offline balance amount based on the current balance amount and the score. For instance, if the current balance is '$500' and the score is '4' out 10, then an amount of '$200' is locked as the offline balance amount. Further, the offline balance amount and the digital certificate are added in the token. The system 114 sends the token that includes the offline balance amount and the digital certificate to the user device 104, via the network 110. The user device 104 receives the token via the application 120*a*. The token is encrypted in the user device 104. In an example embodiment, the encrypted token is embedded in a machine-readable code, such as a QR code. It shall be noted that the description of the present disclosure is made with respect to QR codes being example of machine-readable code for exemplary purposes only, and that the present disclosure can be practiced with any other suitable forms of machine-readable code.

The merchant 106 also registers in an application 120*b* in the merchant device 108. The application 120*b* is hosted by the payment server 112. More specifically, instances of the application, hosted by the payment server 112 may be downloaded and installed in the merchant device 108. In the registration, the merchant 106 provides details that include business related information, such as a merchant identifier, a merchant bank account, an industry classification code, or the like. The details of the merchant 106 are stored in the database 118. After the registration, the merchant 106 sends a request to the payment server 112 for generating the decryption key. The payment server 112 provides the request to the system 114. The system 114 generates the decryption key upon receiving the request. The decryption key is allocated with a validity of a second threshold time period from the generation of the decryption key. The system 114 provides the decryption key to the merchant device 108 using the application 120*b*. The decryption key is stored in the merchant device 108 for decrypting different encrypted tokens of users, such as the user 102.

In an example scenario, the user 102 visits a merchant, such as merchant 106 for initiating an offline payment transaction to the merchant 106. In another example scenario, the user 102 may have ordered an online order with a payment-on-delivery option. In the payment-on-delivery option, the user 102 may use a payment card or a digital wallet for a payment transaction to the merchant 116. However, the user device 104 and the merchant device 108 may not be connected to the network 110 due to connectivity issues. When both the user device 104 and the merchant device 108 are not connected to the network 110, the offline payment transaction is initiated. In such scenarios, a communication channel is established between the user device 104 and the merchant device 108 for the offline payment transaction. The communication channel is established without connecting to the network 110. In an example embodiment, the merchant device 104 establishes the communication channel with the user device 104 using a short-range wireless communication channel, such as a Bluetooth channel, an NFC channel, a Zigbee communication channel, an Infrared communication channel, or the like.

After the communication channel is established, the user 102 provides the QR code to the merchant 106. The merchant 106 scans the QR code using the merchant device 108. The encrypted token in the QR code is extracted after scanning the QR code. The merchant device 108 verifies the encrypted token by using the decryption key available in the merchant device 108. The decrypted token that includes the identifier, the offline balance amount and the digital certificate, is displayed in the merchant device 108. In an example embodiment, the merchant 106 verifies the decrypted token based on identifying an authorized logo or image in the digital certificate.

After the verification, a transaction amount for the offline payment transaction is provided by the merchant 106 in the merchant device 108. In one case, the merchant device 108 determines whether the transaction amount is less than the offline balance amount. In such case, the transaction amount is deducted from the offline balance amount based on the determination. In another case, the merchant device 108 determines whether the transaction amount is more than the offline balance amount. In such case, the transaction amount is modified by the merchant 106 such that it is less than or equal to the offline balance amount. The modified transaction amount is deducted from the offline balance amount and remaining balance (i.e., an outstanding amount) is determined. The offline balance amount is updated based on the deduction. In case of deducting the modified transaction amount, the offline balance amount is updated with the outstanding amount. In an example embodiment, if the transaction amount is more than the offline balance amount, entire offline balance amount can be used for the offline payment transaction and the remaining balance can be paid by the user either in form of cash transaction or by using any other means. The updated offline balance amount is used for updating the decrypted token. The merchant device 108 provides the updated token to the user device 104 via the communication channel.

In an example embodiment, when the user device 104 regains connection to the network 110, the updated token is refreshed. Further, the updated token is exchanged with a new token that is generated by the system 114. For instance, the application **120*a* sends the updated token to the payment server 112. The payment server 112 provides the updated token to the system 114. The system 114 generates the new token that includes a new offline balance amount associated with the payment account and a new digital certificate representing authentication of the new offline balance amount. The new token is allocated with a validity of new threshold time period. In a similar manner, an invalid token is also refreshed when the user device 104 regains the connection. When the invalid token is refreshed, the invalid token is exchanged with the new token allocated with the validity of new threshold time period. In an alternate example embodiment, the offline balance amount (i.e., $200) in the invalid token is credited back to the payment account of the user 102 as soon as the user device 104** regains the connection.

After successfully executing the offline payment transaction, the merchant 106 settles the payment by sending a payment request to the acquirer 122 via a payment network, such as the network 110. The network 110 may be used as the payment network by the payment server 112, the acquirer 122 and the issuer 116 as a payment interchange network. Examples of payment interchange network include, but not limited to, Mastercard® payment system interchange network. It shall be noted that although the description of the present disclosure is made with respect to an offline payment transaction between a user and a merchant, the present disclosure can be practiced for an offline payment transaction in person-to-person (P2P) transactions or similar transactions.

Some non-exhaustive example embodiments of executing the offline payment transaction, while the electronic token and the decryption key are valid, are described with reference to FIGS. 2 to 12.

Figure 2:
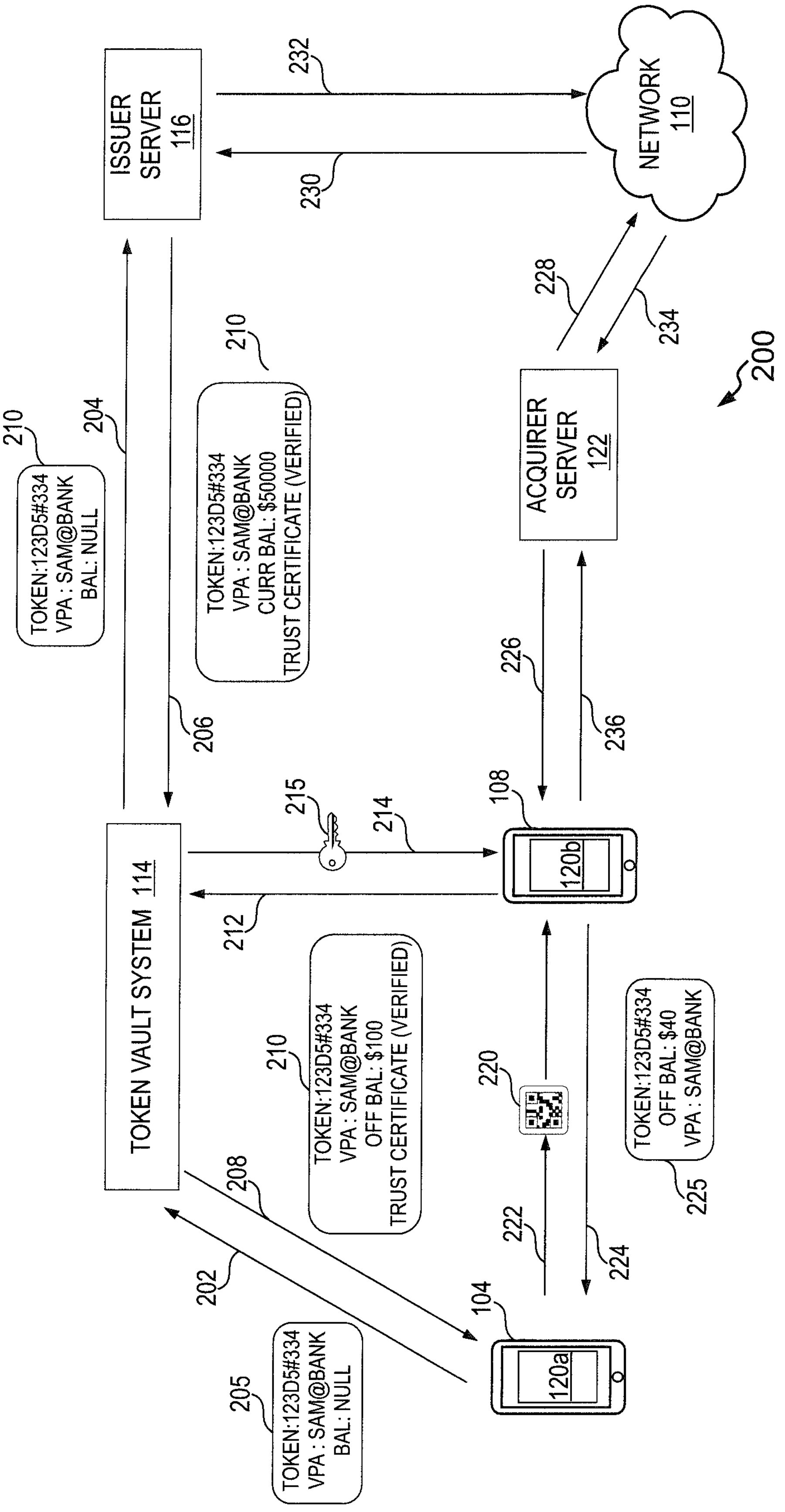
FIG. 2 illustrates a representation depicting a process flow of an electronic token for an offline payment transaction, in accordance with an example embodiment of the present disclosure.

FIG. 2 illustrates a representation 200 depicting a process flow of an offline payment transaction using an electronic token 210, in accordance with an example embodiment of the present disclosure. As explained with reference to FIG. 1, the identifier (e.g., the VPA) is provided to the token vault system 114 after the registration. More specifically, when the user device 104 is connected to the network 110, the application **120*a* runs in backend and communicates with the token vault system 114. It shall be noted that the identifier is shared to the token vault system 114** through a request or an Application Program Interface (API) call.

At 202, the application **120*a* shares the identifier, such as identifier 205 to the token vault system 114 via the network 110. As shown in FIG. 2, the identifier 205 includes a "VPA: SAM@BANK" with a balance amount "BAL: NULL". It is noted that the identifier 205 is shown as merely an example for explanation purpose and should not be considered as limiting the scope of the disclosure. When the system 114 receives the identifier, an electronic token such as an electronic token 210 is generated. The token 210 has a validity of a first threshold time period. For example, the token 210 has a validity time period of 24 hours, 72 hours, or the like. In an example, when the user 102 is performing the offline payment transaction for the first time, then the token 210** may be allocated with a validity of a default threshold time period.

At 204, the system 114 sends the token 210 to the issuer 116. The system 114 identifies the issuer 116 based on the identifier (i.e., SAM@BANK). As shown in FIG. 2, the token 210 "123D5 #334" includes the "VPA: SAM@BANK" and "BAL: NULL". The token 210 is sent to the issuer 116 to fetch the current balance amount along with a score (not shown in figure) and the digital certificate. After receiving the token 210, the issuer 116 issues the current balance amount, the score and the digital certificate. As explained with reference to FIG. 1, the score is computed by the issuer 116 based on a number of success rates of offline payment transactions and a set of rules.

At 206, the token 210 with the current balance amount, the score and the digital certificate are provided to the system 114. As shown in FIG. 2, the token 210 is updated with "CURR BAL: $50000" as the current balance and "TRUST CERTIFICATE (VERIFIED)" as the digital certificate. It shall be noted that the digital certificate is not generalized to a particular network or gateway, however, the digital certificate is issued based on an individual VPA by the issuer 116. That is, the issuer 116 issues the digital certificate based on the VPA (i.e., "SAM@BANK"), without having the need to use details, such as user name, user bank account number, or the like.

The system 114 locks an offline balance amount based on the current balance amount and the score (not shown in FIG. 2). The locked offline balance amount is provided in the token 210. It is noted that the token 210 is shown in FIG. 2 in an exemplary format for explanation purpose and may not be considered as limiting the scope of the present disclosure.

At 208, the token 210 with the offline balance amount, the identifier and the digital certificate is provided to the user device 104. As an example, the token 210 includes the offline balance amount "OFF. BAL: $100". In the user device 104, the token 210 is encrypted. Further, the token 210 (i.e., an encrypted token) is embedded in a QR code, such as QR code 220. The QR code 220 is used for the offline payment transaction, when the user device 104 is not connected to the network 110. Further, the token 210 (i.e., the encrypted token) is decrypted using a decryption key available in the merchant device 108. The merchant device 108 obtains the decryption key from the system 114.

The merchant device 108 communicates with the system 114 using the network 110. For example, at 212, the merchant device 108 sends a request to the system 114 for generating the decryption key. The system 114 generates the decryption key, such as a decryption key 215 with a validity of second threshold time period. At 214, the system 114 provides the decryption key 215 to the merchant device 108. It shall be noted that only one decryption key, such as the decryption key 215 is used for the decryption of different encrypted tokens of users. However, other variations may be possible as per the feasibility. For example, there may be a set of decryption keys, and each decryption key may be used for decryption of encrypted tokens of a certain type of users.

When both the user device 104 and the merchant device 108 are not connected to the network 110, the offline payment transaction is initiated via a communication channel. The communication channel is established between the user device 104 and the merchant device 108 without using the network 110. The communication channel includes, but is not limited to, a near-field communication (NFC) channel, a Bluetooth communication channel, or the like.

At 222, the user device 104 provides the QR code 220 to the merchant device 108. The merchant device 108 scans the QR code 220 and extracts the token 210. The token 210 is verified using the decryption key 215. After the verification, the offline payment transaction is executed. A transaction amount for the offline payment transaction is provided by the merchant 106 in the merchant device 108. For example, the merchant 106 provides a transaction amount of $60. The transaction amount (i.e., $60) is deducted from the offline balance amount (i.e., $100) based on determining whether the transaction amount is less than or more than the offline balance amount, which is further described in FIG. 5.

After the deduction, the merchant device 108 updates the token 210 with an updated offline balance amount. At 224, the updated token, such as token 225 is provided to the user device 104 via the communication channel. As shown in FIG. 2, the token 225 includes the updated offline balance amount "OFF. BAL: $40".

Further, the merchant 106 processes a settlement of the offline payment transaction when the merchant device 108 regains connectivity to the network 110. At 226, the merchant device 108 sends a payment request to an acquirer, such as the acquirer 122. At 228, the acquirer 122 forwards the payment request to the network 110. In an example embodiment, the network 110 is used as a payment network by the payment server 112, the acquirer 122 and the issuer 116 as a payment interchange network. Examples of payment interchange network include, but not limited to, Mastercard® payment system interchange network.

At 230, the payment request is further forwarded to the issuer 116. The issuer 116 validates the payment request and approves a payment amount for the offline payment transaction. At 232, the issuer 116 sends the payment amount to the network 110. At 234, payment amount is provided to the acquirer 122. At 236, the acquirer 122 notifies completion of the payment transaction to the merchant device 108.

Figure 3:
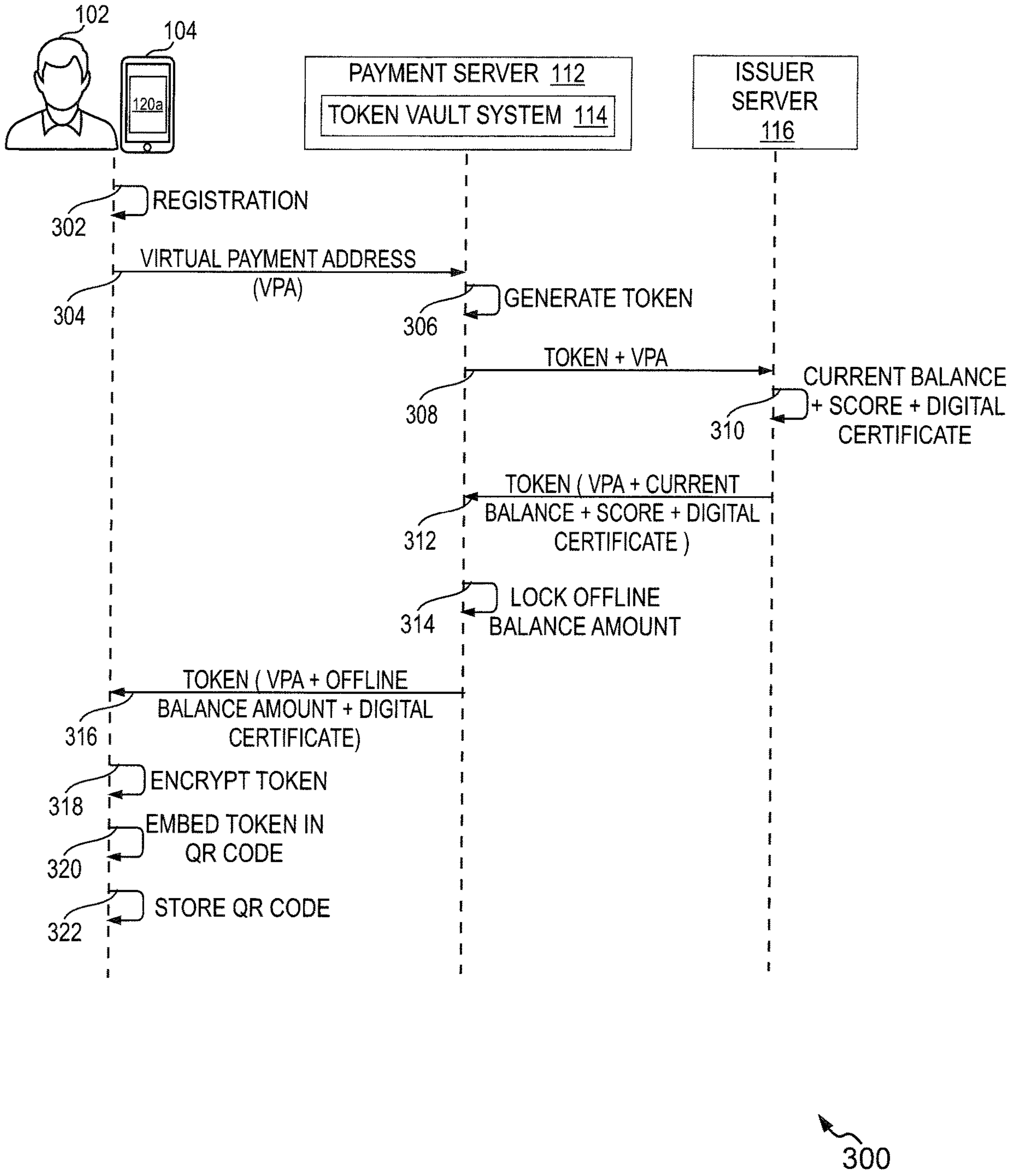
FIG. 3 represents a sequence flow diagram of generating the electronic token based on registration of a user, in accordance with another example embodiment of the present disclosure.
Figure 4:
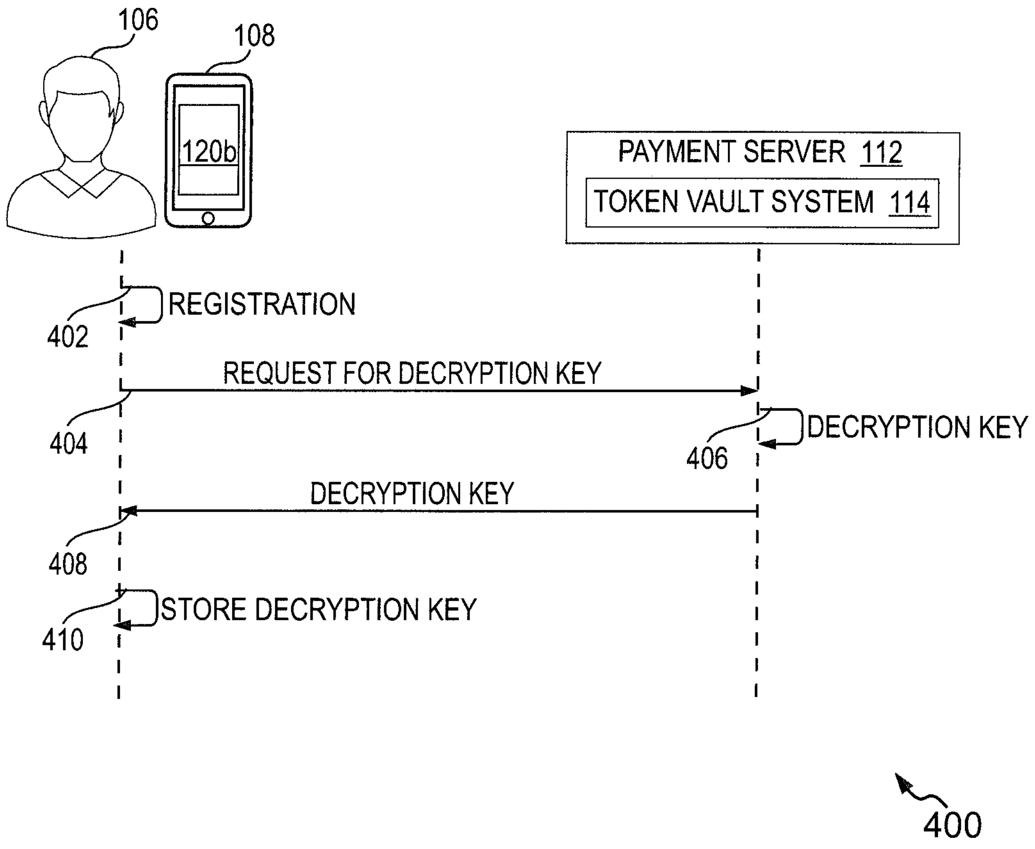
FIG. 4 represents a sequence flow diagram of generating a decryption key for verification of the electronic token based on registration of the merchant, in accordance with an example embodiment of the present disclosure.

The registration of the user 102 for generating the electronic token and the registration of the merchant 106 for generating the decryption key are described further with reference to FIGS. 3 and 4, respectively.

Referring now to FIG. 3, a sequence flow diagram 300 of generating the electronic token based on registration of the user 102, is represented in accordance with an example embodiment of the present disclosure. The registration is performed when the user device 104 is connected to the network 110. The user 102, the user device 104 and the network 110 are described with reference to FIG. 1.

At 302, the user 102 performs a registration of the user 102 in the user device 104 using the application **102*a* (shown in FIG. 1). In the registration, the user 102 provides basic information of the user 102, such as a name, an identifier associated with a payment account of the user 102, an SSN/a PAN of the user 102, a date-of-birth, an email ID, and/or the like. In at least an example embodiment, the identifier includes a VPA of a payment account of the user 102** that is used for performing electronic payment transactions.

At 304, the VPA is shared to the system 114. When the user device 104 is connected to the network 110, the application **120*a* runs in the backend and communicates with the system 114. In the communication, the VPA is shared to the system 114**. In an example embodiment, the VPA is shared via a request or an application program interface (API) call.

At 306, the system 114 generates the electronic token upon receiving the VPA. The token has a validity of a first threshold time period, such as a time period of 24 hours, 72 hours, or the like. In an example embodiment, the token is generated through a PAN mapping. The PAN is mapped to a token value provided by the system 114.

At 308, the system 114 shares the token to the issuer 116 based on the VPA. The system 114 identifies an issuer bank of the user 102 using the VPA, such as 'USER102@ISSUER_BANK'. After identifying the issuer bank (i.e., 'ISSUER_BANK'), the identifier is sent to the issuer 116 based on the VPA (i.e., 'USER102@ISSUER_BANK').

At 310, the issuer 116 issues the current balance amount, the score and the digital certificate upon receiving the token with the VPA. In one example embodiment, the issuer 116 computes the score based on a number of success rates of offline payment transactions. For instance, if the number of success rates is 40%, then the score is computed as 4 out of 10. It shall be noted that the computation of score is described herein as an example and should not be taken to limit the scope of the present disclosure. In another example embodiment, if there is no history of the offline payment transactions, then the score is computed using a set of rules. The set of rules is provided by a rule engine of the issuer 116.

At 312, the issuer 116 sends the token with the current balance amount, the score and the digital certificate to the system 114. At 314, the system 114 locks the offline balance amount based on the current balance amount and the score. For instance, if the current balance amount=$400 with the score=4, then '$100' is locked as the offline balance amount. The locking of the offline balance amount as '$100' based on the current balance amount of '$400' and the score of '4' is described herein as an example. However, the locking mechanism of the offline balance amount may vary and present description should not limit the scope of the present disclosure.

At 316, the system 114 provides the token that includes the VPA, the offline balance amount and the digital certificate to the user device 104. At 318, the token is encrypted in the user device 104. At 320, the token is embedded in a QR code after the encryption. At 322, the QR code is stored in the user device 104. The QR code is used within the valid time period of the token for offline payment transactions in future.

In an embodiment, the validity of the QR code is embedded in the application 102*a* based on the valid time period of the token. The application 102*a* enables a timer after the token embedded in the QR code is received in the user device 104. The application 102*a* disables the QR code as and when the valid time period of the token lapses. For instance, if the QR code embeds the token at 08:00 Hours, then the application 102*a* starts the timer at 08:00 Hours. The validity of the QR code corresponds to the valid time period of the token, such as 12 hours. The application 102*a* disables the QR code at 20:00 hours after the valid time period (i.e. 12 hours) lapses. In another embodiment, the application 102*a* sets the timer for the QR code based on a time stamp (e.g., 17:30 Hours) taken from the network, such as the network 110. The time stamp (i.e., 17:30 Hours) includes the valid time period of the token, such as 12 hours along with date and location. In another embodiment, when the QR code is sent to merchant (e.g., the merchant 106), the merchant receives the time stamp (i.e., 1730 Hours) along with valid time period (i.e., 12 hours). The merchant then approves the transaction if the time is within a specified time frame (i.e., 05:30 Hours). This can also be used to determine a fraud in cases, such as the user device 104 timer was hacked or turned off.

In a similar manner, the merchant 106 is registered for obtaining the decryption key, which is further explained next with reference to FIG. 4.

FIG. 4 represents a sequence flow diagram 400 of generating the decryption key for verification of the token based on registration of the merchant 106, in accordance with an example embodiment of the present disclosure. The merchant 106 connects the merchant device 108 to the network 110 for the registration.

At 402, the merchant 106 performs the registration via the application 120*b* using the merchant device 108. The application 120*b* is described with reference to FIG. 1. In the registration, the merchant 106 provides details of the merchant 106, such as a merchant name, a merchant identifier, an address, an industry classification code, and/or the like.

At 404, the merchant 106 sends a request for generating the decryption key to the system 114. At 406, the system 114 generates the decryption key upon receiving the request. The decryption key has a validity of a second threshold time period for decrypting encrypted tokens, such as the encrypted token 210 described in FIG. 2.

At 408, the system 114 sends the decryption key to the merchant device 108. At 410, the decryption key is stored in the merchant device 108. The decryption key is accessed when the merchant device 108 receives an electronic token (e.g., the electronic token 210 of FIG. 2) for the offline payment transaction. The decryption key stored in the merchant device 108 is used for decrypting different encrypted tokens of different users.

In an illustrative example scenario, the user 102 initiates the offline payment transaction. For instance, if there is no access to a network, such as the network 110, then both the user device 104 and the merchant device 108 are offline. In such scenario, the offline payment transaction is executed using the QR code (e.g., the QR code 220) with the token (e.g., the token 210 of FIG. 2) and a short-range wireless communication channel which connects the user device 104 and the merchant device 108 without the network 110, which is explained next with reference to FIG. 5.

Figure 5:
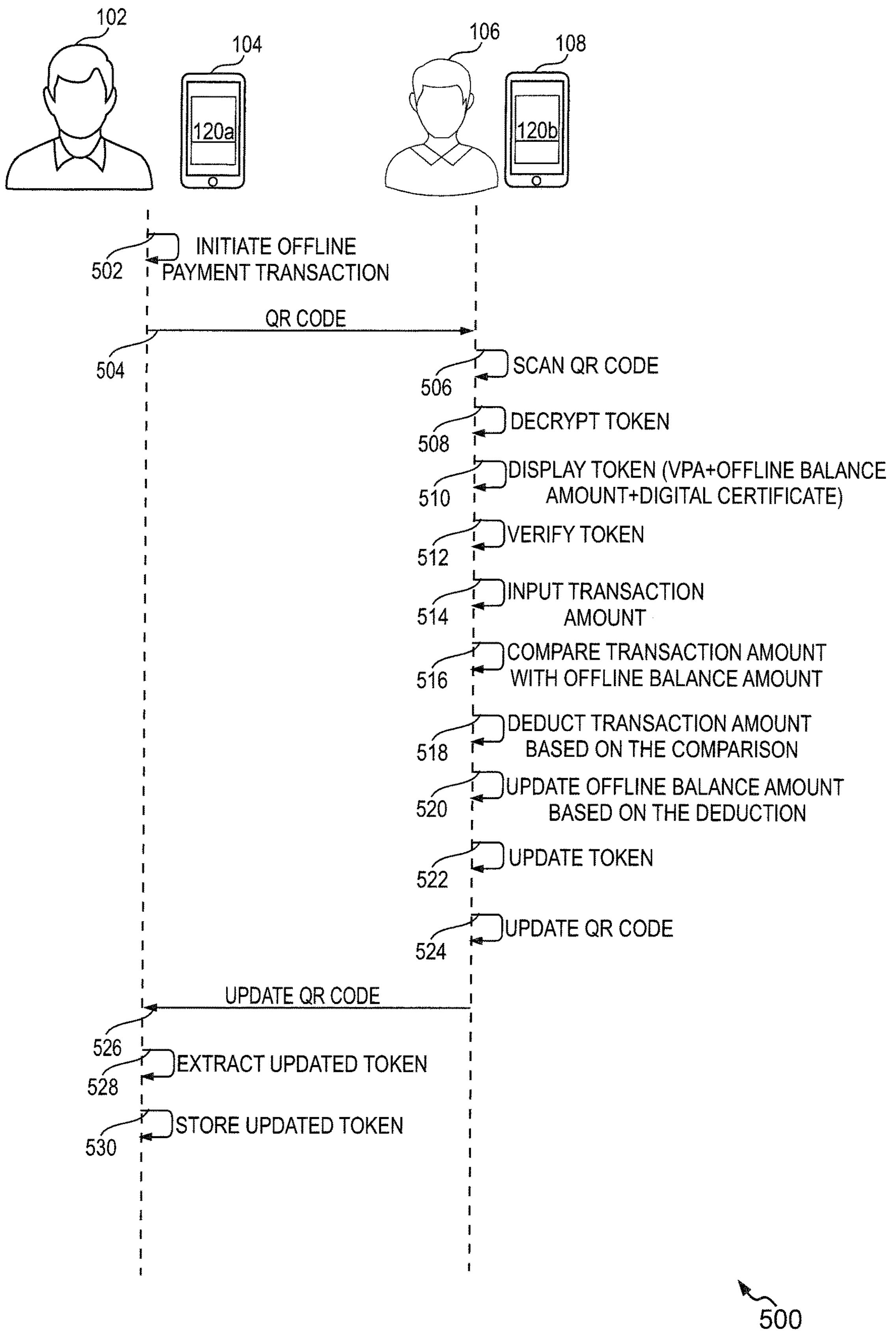
FIG. 5 represents a sequence flow diagram of executing the offline payment transaction using the electronic token, in accordance with another example embodiment of the present disclosure.

Referring now to FIG. 5, a sequence flow diagram 500 of executing the offline payment transaction using the electronic token and the short-range wireless communication channel is represented, in accordance with an example embodiment of the present disclosure. In an illustrative example scenario, the user 102 and the merchant 106 are in a no network zone. The user 102 and the merchant 106 are prevented from performing an online payment transaction due to unavailability of the network. In such scenario, the merchant device 108 establishes a communication channel with the user device 104, without connecting to a network, such as the network 110 of FIG. 1. In an example embodiment, the communication channel is established via a short-range wireless communication channel, such as Bluetooth, NFC, Zigbee, Infrared and/or the like.

At 502, the user 102 initiates the offline payment transaction. The user 102 accesses the QR code stored in the user device 104 (refer FIG. 2). The QR code is displayed in the user device 104.

At 504, the QR code is provided to the merchant device 108. In one example embodiment, the QR code is displayed to the merchant 106. In another example embodiment, the QR code is provided to the merchant device 108 via the communication channel. At 506, the merchant device 108 scans the QR code. When the QR code is scanned, the token in the QR code, which is in encrypted form, is extracted.

At 508, the merchant device 108 decrypts the encrypted token using the decryption key. The decryption key is accessed from a storage unit of the merchant device 108, which is described with reference to FIG. 4. After the decryption, the merchant device 108 displays the decrypted token to the merchant 106 at 510. The decrypted token includes the identifier (e.g., the VPA 'SAM@BANK'), the offline balance amount (e.g., $100) and the digital certificate (e.g., 'VERIFIED TRUST CERTIFICATE'). The decrypted token '123DH #769' with the VPA 'SAM@BANK', the offline balance amount of '$100' and the digital certificate 'VERIFIED TRUST CERTIFICATE' is displayed to the merchant 106. Further, an input field for receiving a transaction amount for the offline payment transaction is displayed in the merchant device 108.

At 512, the decrypted token is verified by the merchant 106. In at least an example embodiment, the merchant 106 verifies the decrypted token based on the digital certificate 'VERIFIED TRUST CERTIFICATE' that includes an authorized watermark or a symbol of the verified trust certificate.

At 514, the merchant 106 provides the transaction amount in the input field. For example, the merchant 106 provides a transaction amount of '$50' in the input field. At 516, the transaction amount is compared with the offline balance amount. In one example embodiment, the merchant device 108 determines whether the transaction amount is less than the offline balance amount. For instance, if the transaction amount is '$50' and the offline balance amount is '$100', which suggests the transaction amount<offline balance amount (i.e., $50<$100). In this case, the transaction amount can be deducted from the offline balance amount.

In some cases, the transaction amount may be more than the offline balance amount. In another example embodiment, the merchant device 108 determines whether the transaction amount is more than the offline balance amount. For instance, let the transaction amount be $150 and the offline balance amount be $100. As the transaction amount is more than the offline balance amount, (i.e., $150>$100), the transaction amount is modified by the merchant 106. In an example embodiment, the transaction amount is modified based on the offline balance amount. For instance, the transaction amount of $150 is modified as transaction amount as equal to $100 based on the offline balance amount (i.e., $100), such that the transaction amount of $100 is deductible from the offline balance amount.

In an alternate example embodiment, the offline payment transaction is declined when the transaction amount is more than the offline balance amount. The merchant 106 may provide a notification on declining the offline payment transaction to the user 102. In another example embodiment, the merchant device 108 generates a copy of the QR code (provided by the user 102). The QR code copy is updated with the outstanding balance amount. The QR code copy is provided to the user device 104 via the communication channel. The user device 104 extracts the updated token with the outstanding balance amount from the QR code copy. When the user device 104 is connected to the network, the token is exchanged with a new electronic token generated by the system 114.

At 518, the transaction amount is deducted from the offline balance amount based on the comparison. In case of the transaction amount being less than the offline balance amount, the transaction amount '$50' is deducted from the offline balance amount '$100'. In case of the transaction amount being more than the offline balance amount, the modified transaction amount is deducted from the offline balance amount. After the deduction of the transaction amount/modified transaction amount, an outstanding balance amount is determined.

At 520, the offline balance amount is updated based on the deduction. In one case, the offline balance amount is updated with remaining balance. For example, after the deduction of the transaction amount=$50 from the offline balance amount=$100, i.e., $100−$50, the updated offline balance amount=$50. In another case, the offline balance amount is updated with the outstanding balance amount. For instance, the updated offline balance amount=−$50.

At 522, the token is updated with the updated offline balance amount. At 524, the QR code is updated with the updated token. At 526, the updated QR code is provided to the user device 104 via the communication channel. At 528, the user device 104 extracts the updated token from the updated QR code. At 530, the updated token is stored in the user device 104.

The information of the offline payment transaction is provided to the issuer 116. In an example embodiment, basic transaction details related to the offline payment transaction corresponding to each identifier is stored in the merchant device 108. When the merchant device 108 is connected to the network 110, the identifier with the basic transaction details is provided to the issuer 116.

Further, the token in the user device 104 is refreshed when the user device 104 is connected to the network 110. More specifically, the updated token is exchanged with a new token, which is explained next with reference to FIG. 6.

Figure 6:
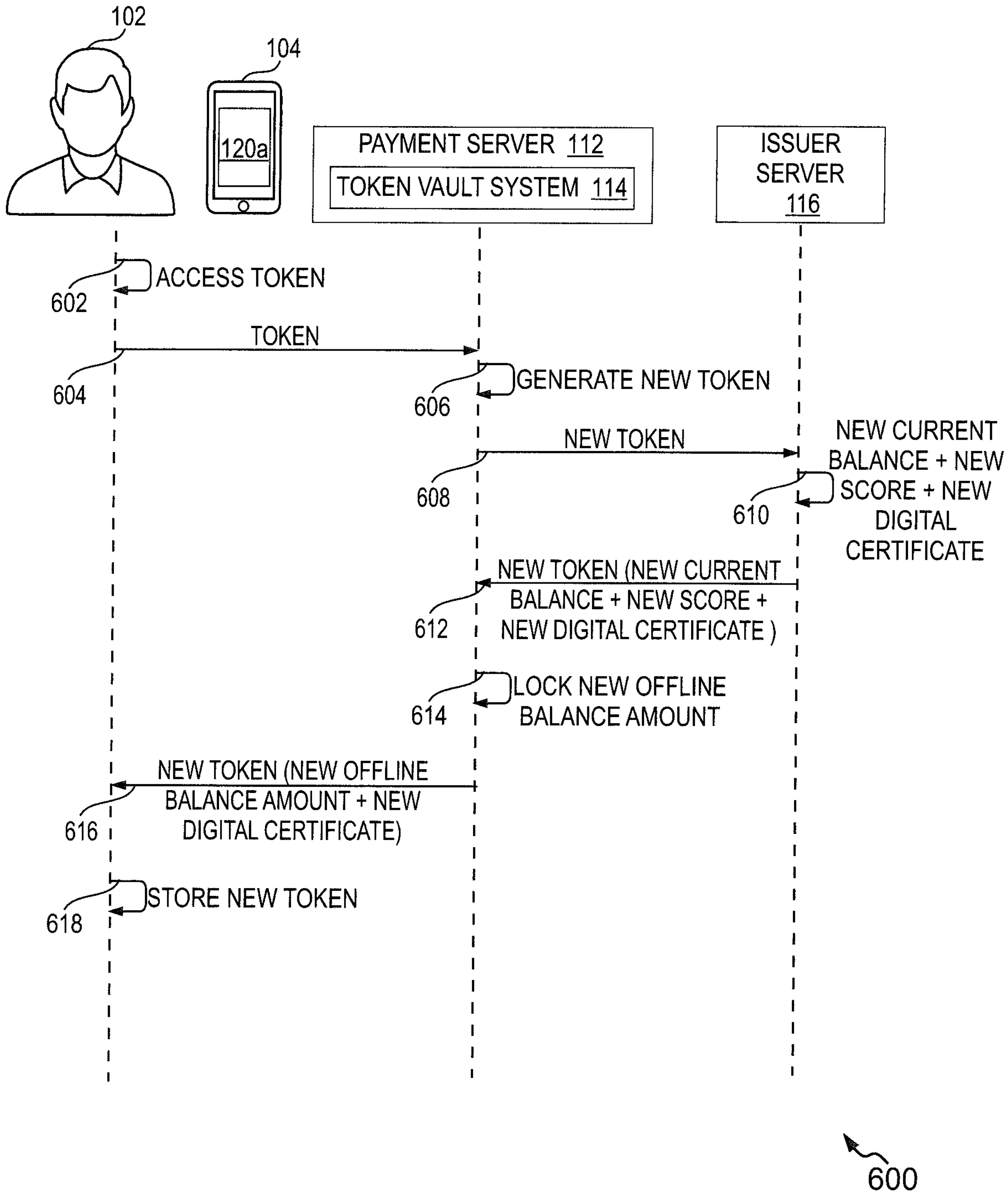
FIG. 6 represents a sequence flow diagram of refreshing the electronic token when a user device is connected to a network, in accordance with an example embodiment of the present disclosure.

Referring now to FIG. 6, a sequence flow diagram 600 of refreshing the electronic token when the user device 104 is connected to the network 110 is illustrated in accordance with another example embodiment of the present disclosure. When the user device 104 is connected to the network 110, the token is refreshed. The token may include, an updated token obtained after the execution of the offline payment transaction, an unused token with expired validity of time period (i.e., an invalid token) or a token with an outstanding balance amount. In some cases, an offline balance amount in the unused token is credited back to the payment account of the user upon expiry of the validity of time period. Moreover, the offline balance amount is credited when the user device 104 regains connection with the payment server 112 via the network 110.

At 602, the token is accessed from the user device 104. At 604, the token is sent to the system 114 via the network 110. At 606, the system 114 generates a new token upon receiving the token. At 608, the new token is shared to the issuer 116 to capture a new current balance amount, a new score for computing a new offline balance amount and a new digital certificate for representing an authentication of the new offline balance amount. The new token is sent to the issuer 116 based on the identifier.

At 610, the issuer issues the new current balance amount, the new score and the new digital certificate. At 612, the issuer 116 sends the new token associated with the new current balance amount, the new score and the new digital certificate to the system 114. At 614, the system 114 locks a new offline balance amount based on the new current balance amount and the new score.

At 616, the system 114 sends the token with the new offline balance amount and the new digital certificate to the user device 104. At 618, the new token is stored in the user device. The new token is encrypted in the user device 104. The encrypted new token is embedded in a new QR code. The new QR code is stored in the user device 104 for using in future offline payment transactions.

Figure 7:
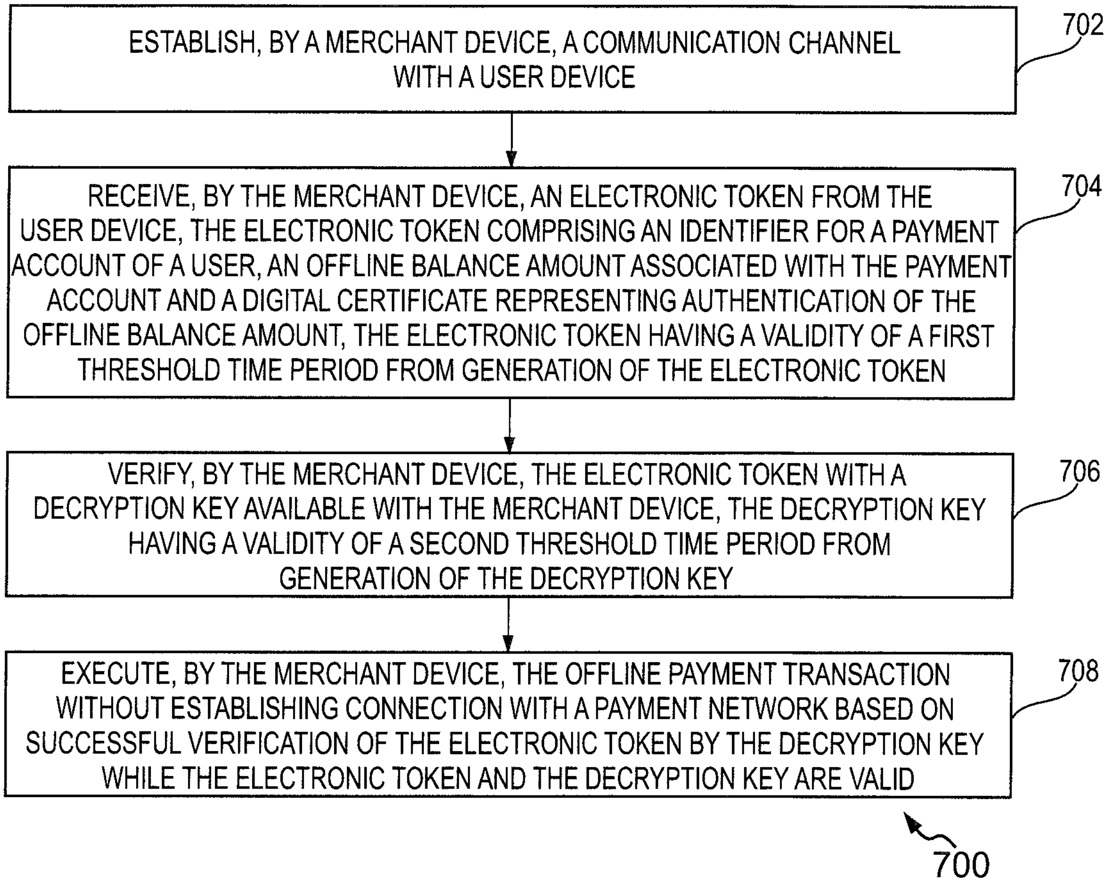
FIG. 7 illustrates a flow diagram depicting a method for performing an offline payment transaction, in accordance with an example embodiment of the present disclosure.

FIG. 7 illustrates a flow diagram depicting a method 700 for performing an offline payment transaction in an offline mode, in accordance with an example embodiment of the present disclosure. The method 700 depicted in the flow diagram may be executed by, for example, the merchant device 108. Operations of the flow diagram 700, and combinations of operation in the flow diagram 700, may be implemented by, for example, hardware, firmware, a processor, circuitry and/or a different device associated with the execution of software that includes one or more computer program instructions. The operations of the method 700 are described herein may be performed by an application interface (e.g., the application 120*b* of FIG. 1) in the merchant device 108 that is hosted and managed with help of the payment server 112. The method 700 starts at operation 702.

At operation 702, the method 700 includes establishing, by a merchant device, a communication channel with a user device. In an illustrative example scenario, a user initiates the offline payment transaction. In such scenario, if a user device and a merchant device are not connected to a network, then the merchant device establishes the communication channel with the user device. The communication channel is a short-range wireless communication channel. The short-range wireless communication channel includes, but is not limited to, a Bluetooth communication channel, a Near-Field communication (NFC) channel, a Zigbee communication channel, an infrared communication channel, or the like.

At operation 704, the method 700 includes receiving, by the merchant device, an electronic token from the user device. The electronic token includes an identifier for a payment account of a user, an offline balance amount associated with the payment account and a digital certificate representing authentication of the offline balance amount. The electronic token has a validity of a first threshold time period from the generation of the electronic token. For example, the electronic token that includes the identifier, such as a VPA 'SAM@BANK' and the offline balance amount of '$200' has a validity time period of 72 hours. Within the 72 hours, the user can perform the offline payment transaction using the electronic token. In at least an example embodiment, the token is embedded in a machine-readable code, such as a QR code. The user provides the QR code to the merchant. The merchant scans the QR code using the merchant device. After scanning the QR code, the token with the identifier, the offline balance amount and the digital certificate is extracted and stored in the merchant device. In at least an example embodiment, the offline balance amount is computed by a payment network based on a current balance amount available in the payment account and a score issued by an issuer of the user for computing the offline balance amount. The score is issued based on at least a number of success rates of offline payment transactions of the user and an average balance amount in the payment account and a set of rules for calculating the score if the number of success rates is null, which is explained in FIG. 3.

At operation 706, the method 700 includes verifying, by the merchant device, the electronic token with a decryption key available with the merchant device. The decryption key has a validity of a second threshold time period from generation of the decryption key. The decryption key is used for decrypting the electronic token. In at least an example embodiment, the decryption key is generated by the token vault system 114, which is described with reference to FIG. 4. The token vault system 114 generates the decryption key based on receiving a request from the merchant device. After the generation, the decryption key is provided to the merchant device. The decryption key is allocated with a validity time period, such as 24 hours, 72 hours, or the like. After the decryption, the decrypted token with the identifier, the offline balance amount and the digital certificate is displayed to the merchant. The merchant authenticates the decrypted token based on the digital certificate.

At operation 708, the method 700 includes executing, by the merchant device, the offline payment transaction without establishing connection with a payment network based on successful verification of the electronic token by the decryption key while the electronic token and the decryption key are valid. In an example embodiment, a transaction amount for offline payment transaction is provided by the merchant. The transaction amount is compared with the offline balance amount, which is described in FIG. 5. In one case, the merchant device determines whether the transaction amount is less than the offline balance amount. When the transaction amount is less, then the transaction amount is deducted from the offline balance amount based on the determination. In another case, the merchant device determines whether the transaction amount is more than the offline balance amount. In such case, the merchant device facilitates a modification of the transaction amount by the merchant based on the determination. The modified transaction amount is deducted from the offline balance amount. For example, if the transaction amount of '$200' is more than the offline balance amount of '$100', then the transaction amount is modified as '$100', which is deductible from the offline balance amount '$100'. The remaining balance is included as an outstanding amount balance amount in the offline balance amount. Further, the offline balance amount is updated based on the deduction. The electronic token is updated with the updated offline balance amount. The updated electronic token is provided to the user device via the communication channel. Moreover, the updated electronic token is exchanged with a new electronic token generated by the payment network when the user device is connected to the payment network (refer FIG. 6). The new electronic token includes a new offline balance amount associated with the payment account and a new digital certificate representing authentication of the new offline balance amount. The new electronic token has a validity of new threshold time period from generation of the new electronic token.

The sequence of operations of the method 700 need not to be necessarily executed in the same order as they are presented. Further, one or more operations may be grouped together and performed in form of a single step, or one operation may have several sub-steps that may be performed in parallel or in sequential manner.

Figure 8:
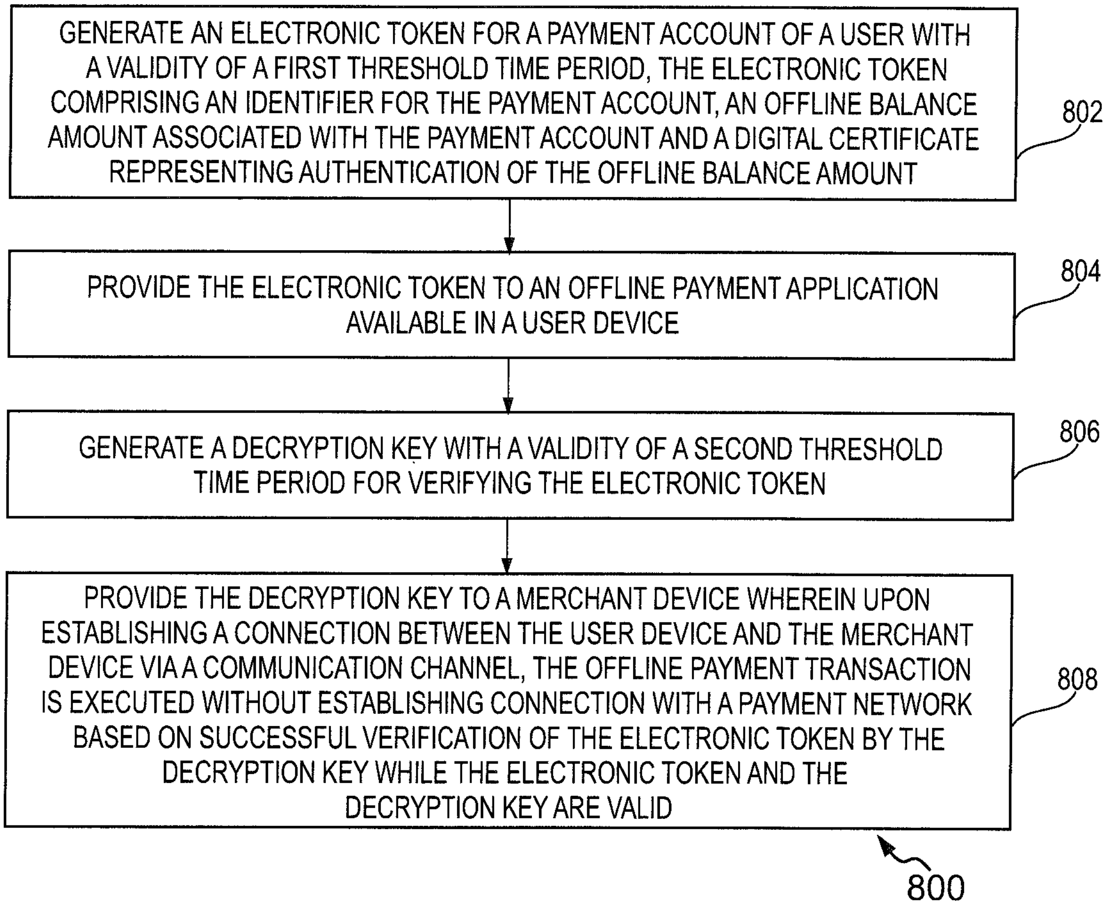
FIG. 8 illustrates a flow diagram depicting a method for performing an offline payment transaction, in accordance with another example embodiment of the present disclosure.

FIG. 8 illustrates a flow diagram depicting a method 800 for performing the offline payment transaction in an offline mode, in accordance with another example embodiment of the present disclosure. The method 800 depicted in the flow diagram may be executed by, for example, the token vault system 114 or the payment server 112. Operations of the flow diagram 800, and combinations of operation in the flow diagram 800, may be implemented by, for example, hardware, firmware, a processor, circuitry and/or a different device associated with the execution of software that includes one or more computer program instructions. The method 800 starts at operation 802.

At operation 802, the method 800 includes generating an electronic token for a payment account of a user with a validity of a first threshold time period. The electronic token includes an identifier for the payment account, an offline balance amount associated with the payment account and a digital certificate representing authentication of the offline balance amount. The electronic token is already explained with reference to FIG. 2.

At operation 804, the method 800 includes providing the electronic token to an offline payment application available in a user device. In an example embodiment, a user registers in the offline payment application using the user device (refer FIG. 3). The offline payment application shares the identifier to the token vault system (e.g., the system 114 of FIG. 1) for generating the electronic token. The token is used to fetch a current balance amount in a payment account of the user, a score for computing an offline balance amount for the offline payment transaction and a digital certificate representing authentication of the digital certificate, that are issued by an issuer of the user (refer FIG. 3). The token vault system computes an offline balance amount based on the score and the current balance amount. The electronic token with the identifier, the offline balance amount and the digital certificate is provided to the user device. The user device encrypts the electronic token and embeds the electronic token in a machine-readable code, such as a QR code, a bar code, or the like. Further, the QR code with the electronic token is used when the user initiates for the offline payment transaction. In an example embodiment, a communication channel is established between the user device and the merchant device without connecting to a network. The merchant device scans the QR code and extracts the electronic token with the identifier, the offline balance amount and the digital certificate.

At operation 806, the method 800 includes generating a decryption key with a validity of a second threshold time period for verifying the electronic token. In at least an example embodiment, a merchant registers in the offline payment application using the merchant device (refer FIG. 4). The merchant provides details, such as a merchant name, a business name, an address, a merchant identifier, an industry classification code, or the like. After the registration, a request for generating the decryption key is sent to the token vault system. The token vault system generates the decryption key allocated with a valid time period.

At operation 808, the method 800 includes providing the decryption key to a merchant device. The decryption key is stored in the merchant device for using in verification of the electronic token. Upon establishing a connection between the user device and the merchant device via a communication channel, the offline payment transaction is executed without establishing connection with a payment network based on successful verification of the electronic token by the decryption key while the electronic token and the decryption key are valid (refer FIG. 5). Further, the merchant device provides an updated electronic token based on deduction of a transaction amount from the offline balance amount. The updated electronic token is provided to the user device via the communication channel. When the user device is connected to the payment network, the updated electronic token is exchanged with a new electronic token generated by the payment network (refer FIG. 6). In an example, the token vault system generates the new electronic token that includes a new offline balance amount associated with the payment account and a new digital certificate representing authentication of the new offline balance amount. The new electronic token has a validity of new threshold time period from generation of the new electronic token.

The sequence of operations of the method 800 need not to be necessarily executed in the same order as they are presented. Further, one or more operations may be grouped together and performed in form of a single step, or one operation may have several sub-steps that may be performed in parallel or in sequential manner.

Figure 9:
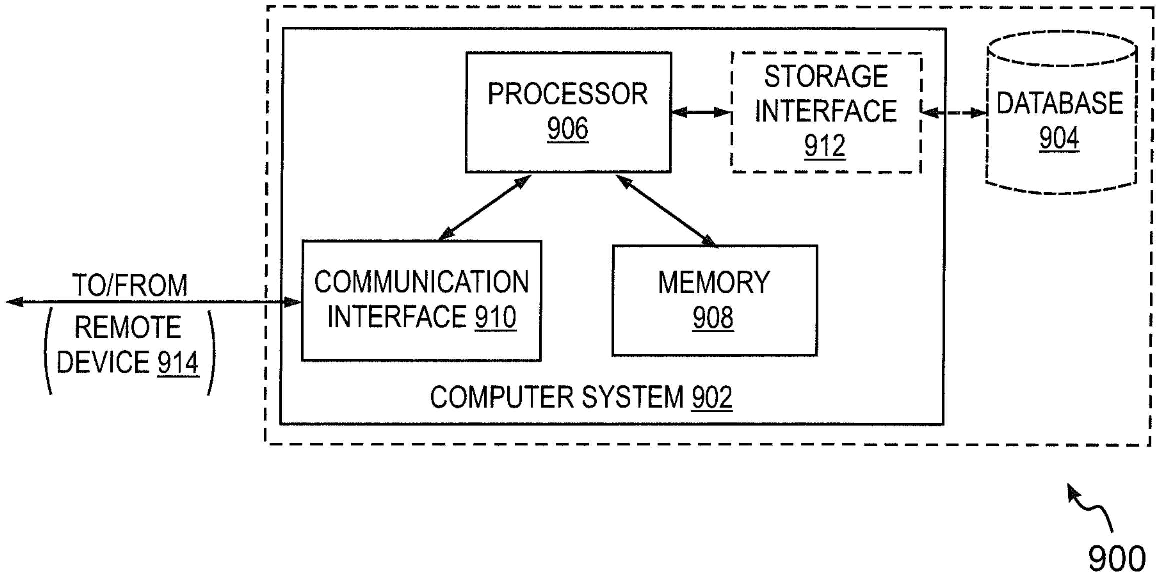
FIG. 9 is a simplified block diagram of a system for performing the offline payment transaction, in accordance with an embodiment of the present disclosure.

FIG. 9 is simplified block diagram of a system 900 for performing the offline payment transaction, in accordance with an embodiment of the present disclosure. The system 900 is an example of a system (e.g., the system 114). The system 900 includes a computer system 902 and a database 904. In an embodiment, the system 900 is integrated in the payment server 112.

The computer system 902 includes at least one processor 906 configured to execute executable instructions for providing various features of the present disclosure. The executing instructions are stored in a memory 908. The components of the computer system 902 provided herein may not be exhaustive and that the computer system 902 may include more or fewer components than that of depicted in FIG. 9. Further, two or more components may be embodied in one single component, and/or one component may be configured using multiple sub-components to achieve the desired functionalities. Some components of the computer system 902 may be configured using hardware elements, software elements, firmware elements and/or a combination thereof.

The processor 906 is operatively coupled to a communication interface 910 such that the computer system 902 is capable of communicating with a remote device 914 such as a user device 104, the merchant device 108, the issuer 116 or communicates with any entity connected to the network 110 (shown in FIG. 1) or any constituents of the payment network. In an embodiment, the communication interface 910 is configured to receive an identifier for a payment account of a user (e.g., the user 102 in FIG. 1) from the user device 104 for generation of an electronic token for an offline payment transaction. The communication interface 910 is configured to fetch a current balance amount, a score for computing an offline balance amount of the payment account and a digital score representing authentication of the offline balance amount from the issuer 116 using the electronic token. Further, the communication interface 910 provides the electronic token associated with the identifier, the offline balance amount and the digital certificate to the user device 104. The communication may be achieved through API calls, without loss of generality.

The processor 906 may also be operatively coupled to the database 904. The database 904 is any computer-operated hardware suitable for storing and retrieving data, such as, but not limited to, information of the user 102, information of the merchant 106, the electronic token, the decryption key, transaction data generated as part of sales activities conducted over the bankcard network including data relating to merchants, payees, or customers, and purchases. The database 904 may also store information related to a plurality of bank accounts of customers. Each user account data includes at least one of a cardholder name, a cardholder address, an account number, MPIN, and other account identifier. The database 904 may also include instructions for settling transactions including merchant bank account information. The database 904 may include multiple storage units such as hard disks and/or solid-state disks in a redundant array of inexpensive disks (RAID) configuration. The database 904 may include a storage area network (SAN) and/or a network attached storage (NAS) system.

In some embodiments, the database 904 is integrated within computer system 902. For example, the computer system 902 may include one or more hard disk drives as the database 904. In other embodiments, the database 904 is external to the computer system 902 and may be accessed by the computer system 902 using a storage interface 912. The storage interface 912 is any component capable of providing the processor 906 with access to the database 904. The storage interface 912 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 906 with access to the database 904.

The processor 906 is configured to generate the electronic token upon receiving the identifier. The electronic token is allocated with a validity of a first threshold time period. In an example embodiment, the processor 906 is configured to compute the offline balance amount based on the current balance amount and the score. Further, the processor 906 is configured to perform one or more of the functions such as: receive a request for generating the decryption key from a merchant device (e.g., the merchant device 108), generate the decryption key that has a validity of a second threshold time period, and send the decryption key to the merchant device 108.

Figure 10:
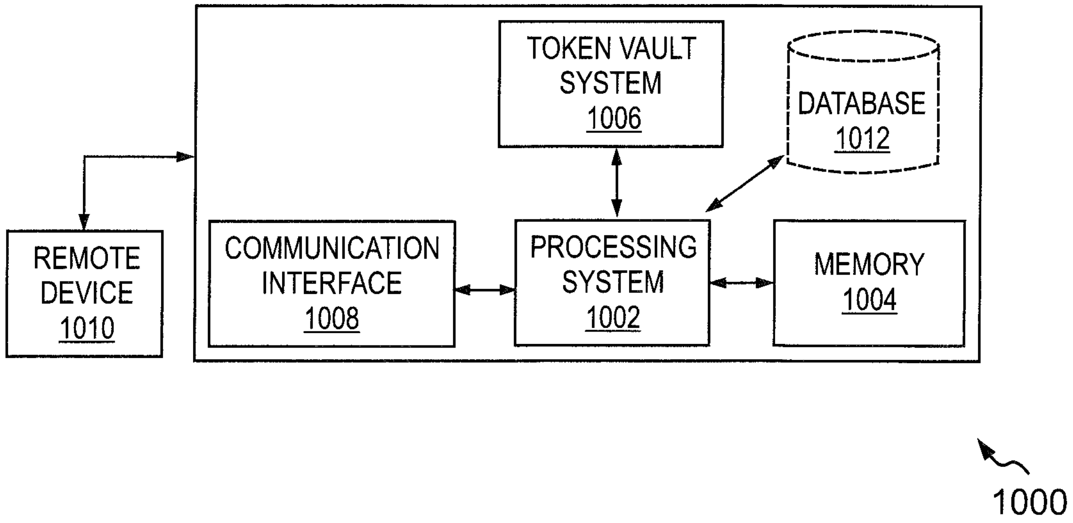
FIG. 10 is a simplified block diagram of a server for hosting the offline payment application for the offline payment transaction, in accordance with an embodiment of the present disclosure.

FIG. 10 is a simplified block diagram of a payment server 1000 for hosting the offline payment application for the offline payment transaction, in accordance with an embodiment of the present disclosure. The payment server 1000 is an example of a server (e.g., the payment server 112). The network 110 may be used as a payment network by the payment server 1000 and the issuer server 1100 as a payment interchange network. Examples of payment interchange network include, but not limited to, Mastercard® payment system interchange network. The payment server 1000 includes a processing system 1002 configured to extract programming instructions from a memory 1004 to provide various features of the present disclosure. Further, the payment server 100 includes a token vault system 1006 and a communication interface 1008. The components of the payment server 1000 provided herein may not be exhaustive and that the payment server 1000 may include more or fewer components than that of depicted in FIG. 10. Further, two or more components may be embodied in one single component, and/or one component may be configured using multiple sub-components to achieve the desired functionalities. Some components of the payment server 1000 may be configured using hardware elements, software elements, firmware elements and/or a combination thereof.

The communication interface 1008 is configured to receive a request from a remote device 1010, such as the user device 104 or the merchant device 108. More specifically, the communication interface 1008 is configured to receive an identifier for a payment account of a user (e.g., the user 102) from the user device 104, generate an electronic token for an offline payment transaction upon receiving the identifier and provide the electronic token to the user device 104. The identifier is provided to the processing system 1002 via the communication interface 1008. In at least an example embodiment, the electronic token is generated by the token vault system 1006. The token vault system 1006 generates the electronic token by mapping a PAN or an SSN of the user to a payment token.

The processing system 1002 is configured to generate a decryption key upon receiving a request from the merchant 106. Further, the communication interface 1008 is configured to receive a payment transaction request from the merchant device 108 via an acquirer, such as the acquirer 122. The communication may be achieved through API calls, without loss of generality. The payment server 1000 includes a database 1012 for storing information of the merchant 106 and the user 102 by the processing system 1002. Further, the database 1012 is configured to store a token repository for the token vault system 1006.

Figure 11:
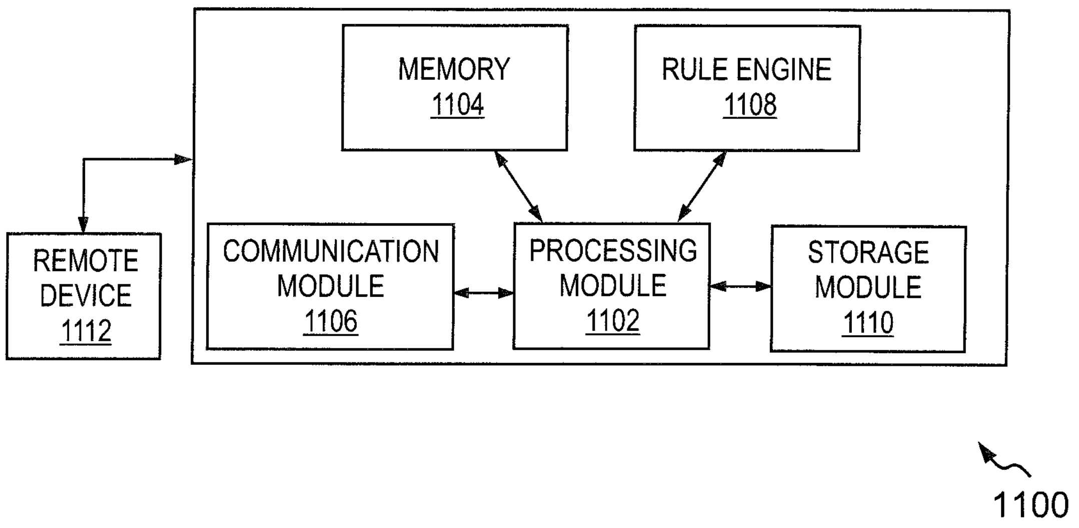
FIG. 11 is a simplified block diagram of an issuer server, in accordance with an embodiment of the present disclosure.

FIG. 11 is a simplified block diagram of an issuer server 1100 of the user 102, in accordance with an embodiment of the present disclosure. The issuer server 1100 is an example of the issuer 116 of FIG. 1, or may be embodied in the issuer 116. The issuer server 1100 is associated with an issuer bank/issuer, in which a user (e.g., the user 102) may have a payment account, which provides a payment card. The issuer server 1100 includes a processing module 1102 operatively coupled to a storage module 1110 and a communication module 1106. The components of the issuer server 1100 provided herein may not be exhaustive and that the issuer server 1100 may include more or fewer components than that of depicted in FIG. 11. Further, two or more components may be embodied in one single component, and/or one component may be configured using multiple sub-components to achieve the desired functionalities. Some components of the issuer server 1100 may be configured using hardware elements, software elements, firmware elements and/or combination thereof.

The storage module 1110 is configured to store machine executable instructions to be accessed by the processing module 1102. Additionally, the storage module 1110 stores information related to, contact information of the user, bank account number, availability of funds in the account, payment card details, transaction details and/or the like. Further, the storage module 1110 is configured to store a history of successful offline payment transactions of the user, and a set of rules for calculating a score for computing an offline balance amount of the payment account. Further, the issuer server 110 includes a rule engine 1108 that is configured to compute the score. In an example embodiment, the rule engine 1108 is configured to access the storage module 1110 to use the set of rules. The set of rules may include rules for computing the score. For instance, the set of rules may be based on various parameters such as current balance, user's credit history, user's payment history, validity of payment account of the user, time elapsed since opening of the payment account of the user, etc. The set of rules may be customized. For instance, a rule may be defined such as that only those payment accounts which are older than 6 months will be provided with the facility of offline transaction. Another rule may be defined that only those users who have maintained a threshold average monthly balance may be provided with the facility of offline transaction. Another rule may be defined based on a type of payment account, for instance, credit card account, debit card account, savings bank account, current bank account, etc. In an example embodiment, based on weighted sum of values associated with these parameters, the score for the particular user can be computed.

The processing module 1102 is configured to communicate with one or more remote devices such as a remote device 1112 using the communication module 1106 over a network, such as the network 110 of FIG. 1. The examples of the remote device 1112 include the user device 104, the merchant device 108, the payment server 112 or other computing systems of issuer and the network 110 and the like. The communication module 1106 is capable of facilitating such operative communication with the remote devices and cloud servers using API (Application Program Interface) calls. The processing module 1102 receives a payment card information, a payment transaction amount, a customer information and merchant information in remote device 1112 (i.e. the payment server 112).

Figure 12:
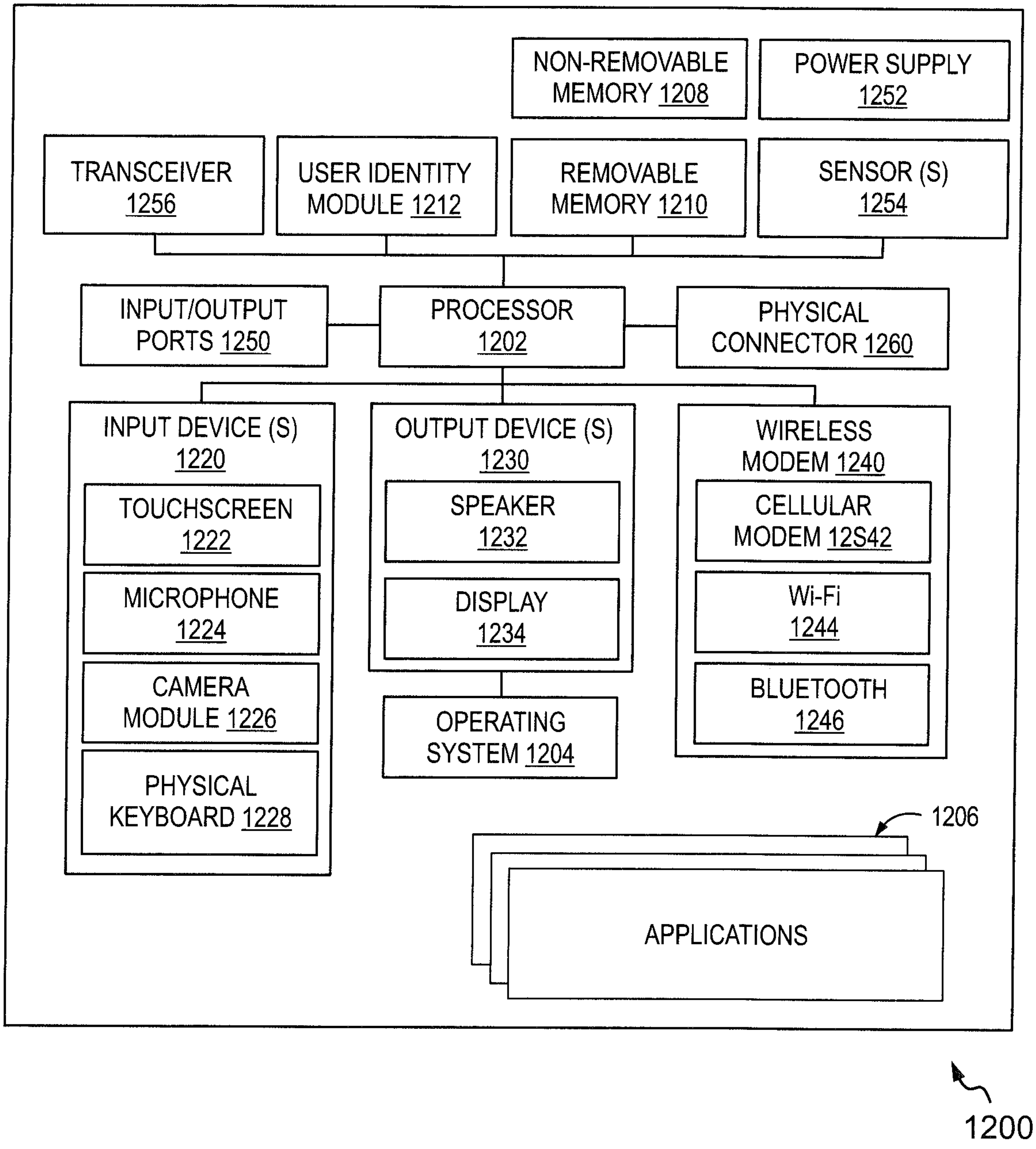
FIG. 12 shows a simplified block diagram of a device for example, a user device or a merchant device capable of implementing the various embodiments of the present disclosure.

FIG. 12 shows a simplified block diagram of a device 1200 for example, a user device or a merchant device capable of implementing the various embodiments of the present disclosure. The device 1200 is depicted to include one or more applications 1206. The device 1200 is an example of the user device 104 and the merchant device 108. It should be understood that the device 1200 as illustrated and hereinafter described is merely illustrative of one type of device and should not be taken to limit the scope of the embodiments. As such, it should be appreciated that at least some of the components described below in connection with that the device 1200 may be optional and thus in an example embodiment may include more, less or different components than those described in connection with the example embodiment of the FIG. 12. As such, among other examples, the device 1200 could be any of an electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated device 1200 includes a controller or a processor 1202 (e.g., a signal processor, microprocessor, ASIC, or other control and processing logic circuitry) for performing such tasks as signal coding, data processing, image processing, input/output processing, power control, and/or other functions. An operating system 1204 controls the allocation and usage of the components of the device 1200 and support for one or more applications programs (see, applications 1206), such as an application interface in a user device (e.g., the user device 104) of a user (e.g., the user 102) or an application interface in a merchant device (e.g., the merchant device 108). The application interface in the user device 104 is used for a registration of the user in an offline payment application, sharing an identifier associated with a payment account of the user, receiving an electronic token associated with an offline balance amount and a digital certificate, encrypting the electronic token and embedding the encrypted token in a QR code.

The application interface in the merchant device 108 is used for scanning the QR code, accessing a decryption key, verifying the electronic token in the QR code using the decryption key and executing the offline payment transaction without establishing connection with a payment network. The offline payment transaction is executed based on successful verification of the electronic token by the decryption key while the electronic token and the decryption key are valid. In addition to the application interface, the applications 1206 may include common mobile computing applications (e.g., telephony applications, email applications, calendars, contact managers, web browsers, messaging applications such as USSD messaging or SMS messaging or SIM Tool Kit (STK) application) or any other computing application.

The illustrated device 1200 includes one or more memory components, for example, a non-removable memory 1208 and/or removable memory 1210. The non-removable memory 1208 and/or removable memory 1210 may be collectively known as database in an embodiment. The non-removable memory 1208 can include RAM, ROM, flash memory, a hard disk, or other well-known memory storage technologies. The removable memory 1210 can include flash memory, smart cards, or a Subscriber Identity Module (SIM). The one or more memory components can be used for storing data and/or code for running the operating system 1204 and the applications 1206. The device 1200 may further include a user identity module (UIM) 1212. The UIM 1212 may be a memory device having a processor built in. The UIM 1212 may include, for example, a subscriber identity module (SIM), a universal integrated circuit card (UICC), a universal subscriber identity module (USIM), a removable user identity module (R-UIM), or any other smart card. The UIM 1212 typically stores information elements related to a mobile subscriber. The UIM 1212 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA7000, wideband CDMA (WCDMA) and time division-synchronous CDMA (TD-SCDMA), or with fourth-generation (4G) wireless communication protocols such as LTE (Long-Term Evolution).

The device 1200 can support one or more input devices 1220 and one or more output devices 1230. Examples of the input devices 1220 may include, but are not limited to, a touch screen/a screen 1222 (e.g., capable of capturing finger tap inputs, finger gesture inputs, multi-finger tap inputs, multi-finger gesture inputs, or keystroke inputs from a virtual keyboard or keypad), a microphone 1224 (e.g., capable of capturing voice input), a camera module 1226 (e.g., capable of capturing still picture images and/or video images) and a physical keyboard 1228. Examples of the output devices 1230 may include, but are not limited to a speaker 1232 and a display 1234. Other possible output devices can include piezoelectric or other haptic output devices. Some devices can serve more than one input/output function. For example, the touch screen 1322 and the display 1234 can be combined into a single input/output device.

A wireless modem 1240 can be coupled to one or more antennas (not shown in the FIG. 12) and can support two-way communications between the processor 1202 and external devices, as is well understood in the art. The wireless modem 1340 is shown generically and can include, for example, a cellular modem 1242 for communicating at long range with the mobile communication network, a Wi-Fi compatible modem 1244 for communicating at short range with an external Bluetooth-equipped device or a local wireless data network or router, and/or a Bluetooth-compatible modem 1246. The wireless modem 1240 is typically configured for communication with one or more cellular networks, such as a GSM network for data and voice communications within a single cellular network, between cellular networks, or between the device 1200 and a public switched telephone network (PSTN).

The device 1200 can further include one or more input/output ports 1250 for establishing connection with peripheral devices including a power supply 1252, one or more sensors 1254 for example, an accelerometer, a gyroscope, a compass, or an infrared proximity sensor for detecting the orientation or motion of the device 1300 and biometric sensors for scanning biometric identity of an authorized user, a transceiver 1256 (for wirelessly transmitting analog or digital signals) and/or a physical connector 1360, which can be a USB port, IEEE 1294 (FireWire) port, and/or RS-232 port. The illustrated components are not required or all-inclusive, as any of the components shown can be deleted and other components can be added.

With the application (see, applications 1206) and/or other software or hardware components, the device 1200 can implement the technologies described herein. In one example embodiment, the processor 1202 can cause registration of the user, sharing the identifier to the token vault system 114, receiving the electronic token associated with the offline balance amount and the digital certificate, and refreshing of the electronic token. The electronic token is valid for a first threshold time period, which provides security for the offline payment transaction. In another example embodiment, the processor 1202 can cause registration of the merchant, sending a request for generating a decryption key to the token vault system 114, verification of the electronic token using the decryption key, and executing the offline payment transaction without establishing connection with a payment network based on successful verification of the decryption key while the electronic token and the decryption key are valid.

Without limiting the scope of the present disclosure, the one or more example embodiments disclosed herein provide methods and systems for executing offline payment transactions in absence of a network connection. More specifically, the offline payment transaction is validated in an offline mode. The offline payment transaction is executed via a communication channel established between a user device and a merchant device without the need of connecting to a network. The user device provides an electronic token that includes an identifier for a payment account of a user, an offline balance amount associated with the payment account and a digital certificate representing authentication of the offline balance amount. The electronic token is verified using a decryption key available with the merchant device. The electronic token and the decryption key have a validity of a first threshold time period and a validity of a second threshold time period respectively. The validity time periods of both the electronic token and the decryption key provide a safe and secure offline payment transaction. The offline payment transaction is executed based on successful verification of the electronic token by the decryption key while the electronic token and the decryption key are valid. Further, the electronic key is refreshed when the user device is connected to the network. The offline payment transaction is settled when the merchant device is connected to the payment network.

The disclosed methods with reference to FIGS. 1 to 12, or one or more operations of the flow diagram 700 and the flow diagram 800 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the system 900 (e.g. system 114) and its various components such as the computer system 902 and the database 904 may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method for performing an offline payment transaction between a merchant device and a user device, the method comprising:

providing the merchant device with an online operating mode and an offline operating mode;

operating, by the merchant device, in the offline operating mode, in the absence of a network connection, by:

establishing, by the merchant device, a communication channel with the user device;

receiving, by the merchant device from the user device, an electronic token generated by a token vault system and encrypted by the user device, wherein the electronic token has a validity of a first threshold time period from generation of the electronic token, and wherein the electronic token comprises:

an identifier for a payment account of a user;

an offline balance amount associated with the payment account; and a digital certificate representing authentication of the offline balance amount, wherein the offline balance amount is a usable amount of a current balance for the offline payment transaction;

verifying, by the merchant device, the electronic token using a decryption key available with the merchant device, the decryption key having a validity of a second threshold time period from generation of the decryption key, wherein verifying, by the merchant device, the electronic token comprises:

decrypting the electronic token using the decryption key if the decryption key is valid; and verifying the decrypted electronic token;

executing, by the merchant device, the offline payment transaction while a connection with a network is not established by the user device or the merchant device, based on a successful verification of the decrypted electronic token, and while the electronic token and the decryption key remain valid, wherein executing, by the merchant device, the offline payment transaction comprises:

updating, by the merchant device, the offline balance amount while the connection with the network is not established; and updating, by the merchant device, the decrypted electronic token based on the updated offline balance amount while the connection with the network is not established;

providing, by the merchant device, the updated electronic token to the user device via the communication channel, wherein the updated electronic token is accessible by the token vault system when the user device is connected to the network; and operating, by the merchant device, in the online operating mode, in the presence of a network connection, by settling the offline payment transaction.

2. The method as claimed in claim 1, wherein the communication channel is a short-range wireless communication channel.

3. The method as claimed in claim 1, wherein the offline balance amount is computed by the token vault system based on a current balance amount available in the payment account and a score issued by an issuer associated with the payment account for computing the offline balance amount, and wherein the score is issued by the issuer based on at least:

a number of success rates of offline payment transactions of the user and an average balance amount in the payment account; and a set of rules for calculating the score if the number of success rates is null.

4. The method as claimed in claim 1, wherein updating, by the merchant device, the offline balance amount comprises:

receiving, by the merchant device, a transaction amount provided by a merchant for the offline payment transaction;

determining, by the merchant device, whether the transaction amount is less than the offline balance amount; and deducting, by the merchant device, the transaction amount from the offline balance amount based on the determination.

5. The method as claimed in claim 1, wherein updating, by the merchant device, the offline balance amount comprises:

receiving, by the merchant device, a transaction amount provided by a merchant for the offline payment transaction;

determining, by the merchant device, whether the transaction amount is more than the offline balance amount;

facilitating, by the merchant device, a modification of the transaction amount by the merchant based on the determination;

deducting, by the merchant device, the modified transaction amount from the offline balance amount; and adding, by the merchant device, an outstanding amount in the offline balance amount upon deducting the modified transaction amount.

6. The method as claimed in claim 1, wherein the new electronic token comprises a new offline balance amount associated with the payment account and a new digital certificate representing authentication of the new offline balance amount, the new electronic token having a validity of new threshold time period from generation of the new electronic token.

7. A system for performing an offline payment transaction between the system and a user device, the system comprising:

one or more processors; and a memory comprising stored instructions which, when executed by the one or more processors, cause the one or more processors to:

provide the system with an online operating mode and an offline operating mode;

operate in the offline operating mode, in the absence of a network connection, to:

establish a communication channel with the user device;

receive, from the user device, an electronic token generated by a token vault system and encrypted by the user device, wherein the electronic token has a validity of a first threshold time period from generation of the electronic token, and wherein the electronic token comprises:

an identifier for a payment account of a user;

an offline balance amount associated with the payment account; and a digital certificate representing authentication of the offline balance amount, wherein the offline balance amount is a usable amount of a current balance for the offline payment transaction;

verify the electronic token using a decryption key available with the system, the decryption key having a validity of a second threshold time period from generation of the decryption key, wherein verify the electronic token comprises:

decrypt the electronic token using the decryption key if the decryption key is valid; and verify the decrypted electronic token;

execute the offline payment transaction while a connection with a network is not established by the user device or the system, based on a successful verification of the decrypted electronic token, and while the electronic token and the decryption key remain valid, wherein execute the offline payment transaction comprises:

update the offline balance amount while the connection with the network is not established; and update the decrypted electronic token based on the updated offline balance amount while the connection with the network is not established;

provide the updated electronic token to the user device via the communication channel, wherein the updated electronic token is accessible by the token vault system when the user device is connected to the network; and operate in the online operating mode, in the presence of a network connection, to settle the offline payment transaction.

8. The system as claimed in claim 7, wherein the communication channel is a short-range wireless communication channel.

9. The system as claimed in claim 7, wherein the offline balance amount is computed by the token vault system based on a current balance amount available in the payment account and a score issued by an issuer associated with the payment account for computing the offline balance amount, and wherein the score is issued based on at least:

a number of success rates of offline payment transactions of the user and an average balance amount in the payment account; and a set of rules for calculating the score if the number of success rates is null.

10. The system as claimed in claim 7, wherein the stored instructions which, when executed by the one or more processors, cause the one or more processors to update the offline balance amount further cause the one or more processors to:

receive a transaction amount provided by a merchant for the offline payment transaction;

determine whether the transaction amount is less than the offline balance amount; and deduct the transaction amount from the offline balance amount based on the determination.

11. The system as claimed in claim 7, wherein the stored instructions which, when executed by the one or more processors, cause the one or more processors to update the offline balance amount further cause the one or more processors to:

receive a transaction amount provided by a merchant for the offline payment transaction;

determine whether the transaction amount is more than the offline balance amount;

facilitate a modification of the transaction amount by the merchant based on the determination;

deduct the modified transaction amount from the offline balance amount; and add an outstanding amount in the offline balance amount upon deducting the modified transaction amount.

12. The system as claimed in claim 7, wherein the new electronic token comprises a new offline balance amount associated with the payment account and a new digital certificate representing authentication of the new offline balance amount, the new electronic token having a validity of new threshold time period from generation of the new electronic token.

13. The method as claimed in claim 1, wherein receiving, by the merchant device from the user device, the electronic token comprises:

receiving a machine-readable code from the user device; and extracting the electronic token from the machine-readable code.

14. The method as claimed in claim 1, wherein verifying the decrypted electronic token comprises verifying the decrypted electronic token based on the digital certificate.

15. The method as claimed in claim 1, wherein the electronic token corresponds to a mapping of the identifier by the token vault system in response to receiving the identifier from the user device.

16. The method as claimed in claim 1, wherein the electronic token corresponds to a mapping of the identifier by the token vault system in response to receiving the identifier from the user device via an application program interface call.

17. The method as claimed in claim 1, wherein decrypting the electronic token using the decryption key comprises:

determining whether the decryption key is valid based on the second threshold time period; and decrypting the electronic token using the decryption key based on determining that the decryption key is valid.

* * * * *